US 9,880,964 B2

(12) United States Patent
Pope

(10) Patent No.: US 9,880,964 B2
(45) Date of Patent: *Jan. 30, 2018

(54) ENCAPSULATED ACCELERATOR

(71) Applicant: SOLARFLARE COMMUNICATIONS, INC., Irvine, CA (US)

(72) Inventor: Steven L. Pope, Costa Mesa, CA (US)

(73) Assignee: SOLARFLARE COMMUNICATIONS, INC., Irvine, CA (US)

( * ) Notice: Subject to any disclaimer, the term of this patent is extended or adjusted under 35 U.S.C. 154(b) by 480 days.

This patent is subject to a terminal disclaimer.

(21) Appl. No.: 14/629,394

(22) Filed: Feb. 23, 2015

(65) Prior Publication Data

US 2015/0161064 A1 Jun. 11, 2015

Related U.S. Application Data

(63) Continuation of application No. 12/964,642, filed on Dec. 9, 2010, now Pat. No. 8,996,644.

(51) Int. Cl.
*G06F 15/16* (2006.01)
*G06F 13/42* (2006.01)
(Continued)

(52) U.S. Cl.
CPC ........ *G06F 13/4221* (2013.01); *G06F 13/102* (2013.01); *G06F 13/28* (2013.01);
(Continued)

(58) Field of Classification Search
CPC ...... G06F 13/102; G06F 13/385; G06F 13/28; G06F 12/1081; G06F 2213/0058; G06F 2213/3808; H04L 49/9068
(Continued)

(56) References Cited

U.S. PATENT DOCUMENTS 4,905,234 A 2/1990 Childress et al.
5,272,599 A 12/1993 Koenen
(Continued)

FOREIGN PATENT DOCUMENTS

EP    620521 A2    10/1994
EP    2463782 A2    6/2012
(Continued)

OTHER PUBLICATIONS

U.S. Appl. No. 15/016,659—Notice of Allowance dated May 25, 2016, 20 pages.
(Continued)

*Primary Examiner* — Oleg Survillo
(74) *Attorney, Agent, or Firm* — Haynes Beffel & Wolfeld LLP

(57) ABSTRACT

A data processing system comprising a host computer system and a network interface device for connection to a network, the host computer system and network interface device being coupled together by means of a data bus, and: the network interface device comprising: a controller unit having a first data port for connection to a network, a second data port, and a data bus interface connected to said data bus, the controller unit being operable to perform, in dependence on the network endpoints to which data packets received at the network interface device are directed, switching of data packets between the first and second data ports and the data bus interface; and an accelerator module having a first medium access controller coupled to said second data port of the controller unit and a processor operable to perform one or more functions in hardware on data packets received at the accelerator module, the said first medium access controller being operable to support one or more first network endpoints; the host computer system supporting: a plurality of guest software domains including a first guest software
(Continued)

domain having an application; and a privileged software domain configured to present a virtual operating platform to said plurality of guest domains, the privileged software entity including a first software driver for the controller unit but not including a second software driver for the accelerator module; wherein the application is configured to access the accelerator module by means of one or more first data packets formed in accordance with a predetermined network protocol and directed to one or more of the first network endpoints.

20 Claims, 3 Drawing Sheets

(51) Int. Cl.
G06F 13/28 (2006.01)
G06F 13/10 (2006.01)
G06F 13/38 (2006.01)
H04L 12/861 (2013.01)
G06Q 40/04 (2012.01)
G06F 12/1081 (2016.01)

(52) U.S. Cl.
CPC ............ *G06F 13/385* (2013.01); *G06Q 40/04* (2013.01); *H04L 49/9068* (2013.01); *G06F 12/1081* (2013.01); *G06F 2213/0058* (2013.01); *G06F 2213/3808* (2013.01)

(58) Field of Classification Search
USPC ........................................................ 709/250
See application file for complete search history.

(56) References Cited

U.S. PATENT DOCUMENTS

| | | |
|---|---|---|
| 5,325,532 A | 6/1994 | Crosswy et al. |
| 5,612,950 A | 3/1997 | Young |
| 5,946,189 A | 8/1999 | Koenen et al. |
| 6,098,112 A | 8/2000 | Ishijima et al. |
| 6,160,554 A | 12/2000 | Krause |
| 6,173,333 B1 | 1/2001 | Jolitz et al. |
| 6,304,945 B1 | 10/2001 | Koenen |
| 6,349,035 B1 | 2/2002 | Koenen |
| 6,427,173 B1 | 7/2002 | Boucher et al. |
| 6,438,130 B1 | 8/2002 | Kagan et al. |
| 6,502,203 B2 | 12/2002 | Barron et al. |
| 6,530,007 B2 | 3/2003 | Olarig et al. |
| 6,591,302 B2 | 7/2003 | Boucher et al. |
| 6,667,918 B2 | 12/2003 | Leader et al. |
| 6,718,392 B1 | 4/2004 | Krause |
| 6,728,743 B2 | 4/2004 | Shachar |
| 6,735,642 B2 | 5/2004 | Kagan et al. |
| 6,768,996 B1 | 7/2004 | Steffens et al. |
| 6,904,534 B2 | 6/2005 | Koenen |
| 6,907,042 B1 | 6/2005 | Oguchi |
| 6,950,961 B2 | 9/2005 | Krause et al. |
| 6,965,941 B2 | 11/2005 | Boucher et al. |
| 6,978,331 B1 | 12/2005 | Kagan et al. |
| 7,089,326 B2 | 8/2006 | Boucher et al. |
| 7,093,158 B2 | 8/2006 | Barron et al. |
| 7,099,275 B2 | 8/2006 | Sarkinen et al. |
| 7,103,626 B1 | 9/2006 | Redo et al. |
| 7,103,744 B2 | 9/2006 | Garcia et al. |
| 7,136,397 B2 | 11/2006 | Sharma |
| 7,143,412 B2 | 11/2006 | Koenen |
| 7,149,227 B2 | 12/2006 | Stoler et al. |
| 7,151,744 B2 | 12/2006 | Sarkinen et al. |
| 7,216,225 B2 | 5/2007 | Haviv et al. |
| 7,240,350 B1 | 7/2007 | Eberhard et al. |
| 7,245,627 B2 | 7/2007 | Goldenberg et al. |
| 7,254,237 B1 | 8/2007 | Jacobson et al. |
| 7,285,996 B2 | 10/2007 | Fiedler |
| 7,316,017 B1 | 1/2008 | Jacobson et al. |
| 7,346,702 B2 | 3/2008 | Haviv |
| 7,386,619 B1 | 6/2008 | Jacobson et al. |
| 7,403,535 B2 | 7/2008 | Modi et al. |
| 7,404,190 B2 | 7/2008 | Krause et al. |
| 7,502,826 B2 | 3/2009 | Barron et al. |
| 7,502,870 B1 | 3/2009 | Chu |
| 7,509,355 B2 | 3/2009 | Hanes et al. |
| 7,518,164 B2 | 4/2009 | Smelloy et al. |
| 7,551,614 B2 | 6/2009 | Teisberg et al. |
| 7,554,993 B2 | 6/2009 | Modi et al. |
| 7,573,967 B2 | 8/2009 | Fiedler |
| 7,580,415 B2 | 8/2009 | Hudson et al. |
| 7,580,495 B2 | 8/2009 | Fiedler |
| 7,617,376 B2 | 11/2009 | Chadalapaka et al. |
| 7,631,106 B2 | 12/2009 | Goldenberg et al. |
| 7,636,703 B2 | 12/2009 | Taylor |
| 7,650,386 B2 | 1/2010 | McMahan et al. |
| 7,653,754 B2 | 1/2010 | Kagan et al. |
| 7,688,838 B1 | 3/2010 | Aloni et al. |
| 7,688,853 B2 | 3/2010 | Santiago et al. |
| 7,702,629 B2 | 4/2010 | Cytron et al. |
| 7,725,556 B1 | 5/2010 | Schlansker et al. |
| 7,757,232 B2 | 7/2010 | Hilland et al. |
| 7,801,027 B2 | 9/2010 | Kagan et al. |
| 7,802,071 B2 | 9/2010 | Oved |
| 7,813,460 B2 | 10/2010 | Fiedler |
| 7,827,442 B2 | 11/2010 | Sharma et al. |
| 7,835,375 B2 | 11/2010 | Sarkinen et al. |
| 7,835,380 B1 | 11/2010 | Aloni et al. |
| 7,848,322 B2 | 12/2010 | Oved |
| 7,856,488 B2 | 12/2010 | Cripe et al. |
| 7,864,787 B2 | 1/2011 | Oved |
| 7,895,445 B1 | 2/2011 | Albanese et al. |
| 7,904,576 B2 | 3/2011 | Krause et al. |
| 7,921,178 B2 | 4/2011 | Haviv |
| 7,929,539 B2 | 4/2011 | Kagan et al. |
| 7,930,437 B2 | 4/2011 | Kagan et al. |
| 7,934,959 B2 | 5/2011 | Rephaeli et al. |
| 7,945,528 B2 | 5/2011 | Cytron et al. |
| 7,954,114 B2 | 5/2011 | Chamberlain et al. |
| 7,978,606 B2 | 7/2011 | Buskirk et al. |
| 8,000,336 B2 | 8/2011 | Harel |
| 8,156,101 B2 | 4/2012 | Indeck et al. |
| 8,286,193 B2 | 10/2012 | Pope et al. |
| 8,326,816 B2 | 12/2012 | Colle et al. |
| 8,332,285 B1 | 12/2012 | Barua et al. |
| 8,346,919 B1 | 1/2013 | Eiriksson et al. |
| 8,996,644 B2 | 3/2015 | Pope |
| 9,003,053 B2 | 4/2015 | Pope et al. |
| 9,456,060 B2 | 9/2016 | Pope et al. |
| 2001/0036184 A1 | 11/2001 | Kinoshita et al. |
| 2002/0059052 A1 | 5/2002 | Bloch et al. |
| 2002/0095519 A1 | 7/2002 | Philbrick et al. |
| 2002/0107971 A1 | 8/2002 | Bailey et al. |
| 2002/0112139 A1 | 8/2002 | Krause et al. |
| 2002/0129293 A1 | 9/2002 | Hutton et al. |
| 2002/0140985 A1 | 10/2002 | Hudson |
| 2002/0156784 A1 | 10/2002 | Hanes et al. |
| 2002/0174240 A1 | 11/2002 | Nason et al. |
| 2002/0198990 A1 | 12/2002 | Bradfield et al. |
| 2003/0007165 A1 | 1/2003 | Hudson |
| 2003/0033588 A1 | 2/2003 | Alexander |
| 2003/0058459 A1 | 3/2003 | Wu et al. |
| 2003/0063299 A1 | 4/2003 | Cowan et al. |
| 2003/0065856 A1 | 4/2003 | Kagan et al. |
| 2003/0081060 A1 | 5/2003 | Zeng et al. |
| 2003/0086300 A1 | 5/2003 | Noyes et al. |
| 2003/0172330 A1 | 9/2003 | Barron et al. |
| 2003/0191786 A1 | 10/2003 | Matson et al. |
| 2003/0202043 A1 | 10/2003 | Zeng et al. |
| 2003/0214677 A1 | 11/2003 | Bhaskar et al. |
| 2004/0015502 A1 | 1/2004 | Alexander et al. |
| 2004/0071250 A1 | 4/2004 | Bunton et al. |
| 2004/0073716 A1 | 4/2004 | Boom et al. |
| 2004/0141642 A1 | 7/2004 | Zeng et al. |
| 2004/0156393 A1 | 8/2004 | Gupta et al. |
| 2004/0190533 A1 | 9/2004 | Modi et al. |
| 2004/0190538 A1 | 9/2004 | Bunton et al. |

(56) References Cited

U.S. PATENT DOCUMENTS

| | | |
|---|---|---|
| 2004/0190557 A1 | 9/2004 | Barron |
| 2004/0193734 A1 | 9/2004 | Barron et al. |
| 2004/0193825 A1 | 9/2004 | Garcia et al. |
| 2004/0210670 A1 | 10/2004 | Anerousis et al. |
| 2004/0210754 A1 | 10/2004 | Barron et al. |
| 2004/0240435 A1 | 12/2004 | Boucher et al. |
| 2004/0249881 A1 | 12/2004 | Jha et al. |
| 2004/0249998 A1 | 12/2004 | Rajagopalan et al. |
| 2004/0252685 A1 | 12/2004 | Kagan et al. |
| 2005/0008223 A1 | 1/2005 | Zeng et al. |
| 2005/0018221 A1 | 1/2005 | Zeng et al. |
| 2005/0021874 A1 | 1/2005 | Georgiou et al. |
| 2005/0038918 A1 | 2/2005 | Hilland et al. |
| 2005/0038941 A1 | 2/2005 | Chadalapaka et al. |
| 2005/0039171 A1 | 2/2005 | Avakian et al. |
| 2005/0039172 A1 | 2/2005 | Rees et al. |
| 2005/0039187 A1 | 2/2005 | Avakian et al. |
| 2005/0066333 A1 | 3/2005 | Krause et al. |
| 2005/0137964 A1 | 6/2005 | Nordlicht et al. |
| 2005/0172181 A1 | 8/2005 | Huliehel |
| 2005/0219278 A1 | 10/2005 | Hudson |
| 2005/0219314 A1 | 10/2005 | Donovan et al. |
| 2005/0231751 A1 | 10/2005 | Wu et al. |
| 2006/0026443 A1 | 2/2006 | McMahan et al. |
| 2006/0045098 A1 | 3/2006 | Krause |
| 2006/0126619 A1 | 6/2006 | Teisberg et al. |
| 2006/0165074 A1 | 7/2006 | Modi et al. |
| 2006/0187931 A1 | 8/2006 | Hwang |
| 2006/0193318 A1 | 8/2006 | Narasimhan et al. |
| 2006/0228637 A1 | 10/2006 | Jackson et al. |
| 2006/0248191 A1 | 11/2006 | Hudson et al. |
| 2007/0067497 A1 | 3/2007 | Craft et al. |
| 2007/0121596 A1 | 5/2007 | Kurapati et al. |
| 2007/0188351 A1 | 8/2007 | Brown et al. |
| 2007/0209069 A1 | 9/2007 | Saklikar et al. |
| 2007/0220183 A1 | 9/2007 | Kagan et al. |
| 2007/0223385 A1 | 9/2007 | Berly et al. |
| 2007/0237327 A1 | 10/2007 | Taylor et al. |
| 2007/0260602 A1 | 11/2007 | Taylor |
| 2007/0277036 A1 | 11/2007 | Chamberlain et al. |
| 2008/0008205 A1 | 1/2008 | Jung et al. |
| 2008/0024586 A1 | 1/2008 | Barron |
| 2008/0109526 A1 | 5/2008 | Subramanian et al. |
| 2008/0115216 A1 | 5/2008 | Barron et al. |
| 2008/0115217 A1 | 5/2008 | Barron et al. |
| 2008/0126509 A1 | 5/2008 | Subramanian et al. |
| 2008/0135774 A1 | 6/2008 | Hugers |
| 2008/0140574 A1 | 6/2008 | Boucher et al. |
| 2008/0147828 A1 | 6/2008 | Enstone et al. |
| 2008/0148400 A1 | 6/2008 | Barron et al. |
| 2008/0177890 A1 | 7/2008 | Krause et al. |
| 2008/0189373 A1 | 8/2008 | Ikonen et al. |
| 2008/0244060 A1 | 10/2008 | Cripe et al. |
| 2008/0301406 A1 | 12/2008 | Jacobson et al. |
| 2008/0304519 A1 | 12/2008 | Koenen et al. |
| 2009/0024758 A1 | 1/2009 | Levy-Abegnoli et al. |
| 2009/0060197 A1 | 3/2009 | Taylor et al. |
| 2009/0165003 A1 | 6/2009 | Jacobson et al. |
| 2009/0182683 A1 | 7/2009 | Taylor et al. |
| 2009/0183057 A1 | 7/2009 | Aizman |
| 2009/0201926 A1 | 8/2009 | Kagan et al. |
| 2009/0213856 A1 | 8/2009 | Paatela et al. |
| 2009/0268612 A1 | 10/2009 | Felderman et al. |
| 2009/0287628 A1 | 11/2009 | Indeck et al. |
| 2009/0302923 A1 | 12/2009 | Smeloy et al. |
| 2010/0012718 A1 | 1/2010 | Griswold et al. |
| 2010/0088437 A1 | 4/2010 | Zahavi |
| 2010/0128623 A1* | 5/2010 | Dunn ............ H04L 29/12952 370/252 |
| 2010/0138840 A1 | 6/2010 | Kagan et al. |
| 2010/0169880 A1 | 7/2010 | Haviv et al. |
| 2010/0185719 A1* | 7/2010 | Howard ................ G06F 8/45 709/201 |
| 2010/0188140 A1 | 7/2010 | Smeloy |
| 2010/0189206 A1 | 7/2010 | Kagan |
| 2010/0198850 A1 | 8/2010 | Cytron et al. |
| 2010/0199085 A1* | 8/2010 | Bansal ............ H04L 63/164 713/153 |
| 2010/0265849 A1 | 10/2010 | Harel |
| 2010/0274876 A1 | 10/2010 | Kagan et al. |
| 2011/0004457 A1 | 1/2011 | Haviv et al. |
| 2011/0010557 A1 | 1/2011 | Kagan et al. |
| 2011/0019574 A1 | 1/2011 | Malomsoky et al. |
| 2011/0029669 A1 | 2/2011 | Chuang et al. |
| 2011/0029847 A1 | 2/2011 | Goldenberg et al. |
| 2011/0040701 A1 | 2/2011 | Singla et al. |
| 2011/0044344 A1 | 2/2011 | Hudson et al. |
| 2011/0058571 A1 | 3/2011 | Bloch et al. |
| 2011/0083064 A1 | 4/2011 | Kagan et al. |
| 2011/0096668 A1 | 4/2011 | Bloch et al. |
| 2011/0113083 A1 | 5/2011 | Shahar |
| 2011/0116512 A1 | 5/2011 | Crupnicoff et al. |
| 2011/0119673 A1 | 5/2011 | Bloch et al. |
| 2011/0151896 A1 | 6/2011 | Goldman et al. |
| 2011/0173352 A1 | 7/2011 | Sela et al. |
| 2011/0178917 A1 | 7/2011 | Parsons et al. |
| 2011/0178918 A1 | 7/2011 | Parsons et al. |
| 2011/0178919 A1 | 7/2011 | Parsons et al. |
| 2011/0178957 A1 | 7/2011 | Parsons et al. |
| 2011/0179315 A1 | 7/2011 | Yang |
| 2011/0184844 A1 | 7/2011 | Parsons et al. |
| 2012/0089496 A1 | 4/2012 | Taylor et al. |
| 2012/0089497 A1 | 4/2012 | Taylor et al. |
| 2012/0095893 A1 | 4/2012 | Taylor et al. |
| 2012/0102245 A1 | 4/2012 | Gole et al. |
| 2012/0108230 A1 | 5/2012 | Stepanian |
| 2012/0136514 A1 | 5/2012 | Noffsinger et al. |
| 2012/0151004 A1 | 6/2012 | Pope |
| 2012/0246052 A1 | 9/2012 | Taylor et al. |
| 2013/0007000 A1 | 1/2013 | Indeck et al. |
| 2013/0080651 A1 | 3/2013 | Pope et al. |
| 2013/0145035 A1 | 6/2013 | Pope et al. |
| 2014/0105208 A1 | 4/2014 | Pope et al. |
| 2014/0310405 A1 | 10/2014 | Pope et al. |
| 2015/0049763 A1 | 2/2015 | Michels et al. |
| 2015/0169496 A1 | 6/2015 | Pope |
| 2016/0156749 A1 | 6/2016 | Pope et al. |
| 2016/0373561 A1 | 12/2016 | Pope et al. |

FOREIGN PATENT DOCUMENTS

| | | |
|---|---|---|
| WO | 00/10095 A1 | 2/2000 |
| WO | 2001048972 A1 | 7/2001 |
| WO | 2002035838 A1 | 5/2002 |
| WO | 2008127672 A2 | 10/2008 |
| WO | 2009136933 A1 | 11/2009 |
| WO | 20099134219 A1 | 11/2009 |
| WO | 2010020907 A2 | 2/2010 |
| WO | 2010087826 A1 | 8/2010 |
| WO | 2011043769 A1 | 4/2011 |
| WO | 2011053305 A1 | 5/2011 |
| WO | 2011053330 A1 | 5/2011 |

OTHER PUBLICATIONS

U.S. Appl. No. 14/231,510—Office Action dated Mar. 24, 2016, 16 pages.

U.S. Appl. No. 13/789,353—Response to Jul. 28 Office Action filed Sep. 25, 2015, 13 pages.

U.S. Appl. No. 13/789,353—Advisory Action dated Oct. 16, 2015, 4 pages.

U.S. Appl. No. 13/789,353—Response to Oct. 16 Advisory Action filed Oct. 27, 2015, 14 pages.

U.S. Appl. No. 13/789,353—Office Action dated Jul. 7, 2016, 29 pages.

Druschel et al., "Lazy Receiver Processing (LRP): A Network Subsytem Architecture for Server Systems," 1996, Department of Computer Science, Rice University, 15 pages.

Wikia, "Raw/TCP," IwIP—lightweight TCP/IP last changed Jun. 16, 2011,<http://Iwip.wikia.com/wiki/Raw/TCP> retrieved Aug. 30, 2016, 6 pages.

(56) References Cited

OTHER PUBLICATIONS

Johnson et al., "The Peregrine High-Performance RPC System—Software-Practice and Experience," Feb. 1993, vol. 23(2), pp. 201-221.
Ganger et al., "Fast and Flexible Application-Level Networking on Exokernel Systems," Feb. 2002, ACM Transactions on Computer Systems, vol. 20(1), pp. 49-83.
Engler et al., "Exokernel: An Operating System Architecture for Application-Level Resource Management," 1995, M.I.T. Laboratory for Computer Science Cambridge, MA 02139, U.S.A, pp. 1-16.
Engler et al., "DPF: Fast, Flexible Message Demultiplexing using Dynamic Code Generation," 1996, M.I.T. Laboratory for Computer Science Cambridge, MA 02139, U.S.A., pp. 1-7.
"Exokernel—Structure and Architecture of MIT's Exokernel," 2000, 18 pages.
"Introduction to the tuxgraphics TCP/IP stack, 3rd generation," generated Feb. 25, 2012, version 2.57<http://www.tuxgraphics.org/electronics/200905/embedded-tcp-ip-stack.shtml>, retrieved Aug. 30, 2016, 27 pages.
Engler et al., " Exokernels MIT Lab for Computer Science slides," 1998,<https://pdos.csail.mit.edu/archive/exo/exo-slides/sld011.htm>, 45 pages, slide 11 in particular.
Wikipedia, "TUX web server," last modified Aug. 30, 2015, <https://en.wikipedia.org/wiki/TUX_web_server>, retreived Aug. 30, 2016, 2 pages.
Kaashoek et al., "Application Performance and Flexibility on Exokernel Systems," <www2.cs.uh.edu/~paris/6360/PowerPoint/Xok.ppt> retreived Aug. 30, 2016, 23 pages, slide 10 in particular.
Kaashoek et al., "Application Performance and Flexibility on Exokernel Systems," 1995, M.I.T. Laboratory for COmputer Science, Cambridge, MA 02139, U.S.A, pp. 1-14.
U.S. Appl. No. 13/671,434—Response to Mar. 23 Office Action filed Jul. 8, 2016 , 18 pages.
U.S. Appl. No. 13/671,434—Notice of Allowance dated Nov. 7, 2016, 8 pages.
U.S. Appl. No. 13/789,353—Response to Jul. 7 Office Action filed Oct. 7, 2016, 17 pages.
U.S. Appl. No. 13/754,792—Response to Dec. 18 Office Action filed Jun. 16, 2016, 22 pages.
U.S. Appl. No. 13/754,792—Office Action dated Sep. 23, 2016, 36 pages.
U.S. Appl. No. 14/231,510—Response to Mar. 24 Office Action filed Aug. 22, 2016, 14 pages.
Vinay Aggarwal, et al.; "Workshop on network-I/O convergence: experience, lessons, implications (NICELI)," ACM Computer Communication Review, vol. 33, No. 5, pp. 75-80, Oct. 2003.
Vinton Cert, Robert Kahn; "A Protocol for Packet Network Intercommunication," IEEE Transactions on Communications, vol. COM-22, No. 5, 13 pages, May 1974.
W. E. Leland, et al.; "On the Self-Similar Nature of Ethernet Traffic," ACM Computer Communication Review, vol. 23, No. 4, pp. 183-193, Oct. 1993.
W. Feng and P. Tinnakornsrisuphap; "The Failure of TCP in High-Performance Computational Grids," Proceedings of the 2000 ACM/IEEE conference on Supercomputing, Dallas, Texas, 11 pages, Nov. 4, 2000.
W. Feng, et al.; "Performance Characterization of a 10-Gigabit Ethernet TOE," Proceedings of the 13th Symposium on High Performance Interconnects, pp. 1-6, Aug. 17, 2005.
Wu-chun Feng, et al.; "Optimizing 10-Gigabit Ethernet for Networks ofWorkstations, Clusters, and Grids: A Case Study," Proceedings of the 2003 ACM/IEEE conference on Supercomputing, Phoenix, Arizona, 13 pages, Nov. 15, 2003.
EP 12185546.4—Extended European Search Report dated Jul. 13, 2013, 6 pages.
EP 13187725.0-1953—Extended European Search Report dated Feb. 19, 2014, (6 pages).
EP 13153148.5-1953—Extended European Search Report dated Feb. 19, 2014, 6 pages.
U.S. Appl. No. 12/964,642—Notice of Allowance dated Nov. 26, 2014, 21 pages.
U.S. Appl. No. 13/624,788—Notice of Allowance dated Dec. 5, 2014, 12 pages.
U.S. Appl. No. 13/283,420—Office Action dated Dec. 3, 2014, 66 pages.
E. Ruetsche; "The Architecture of Gb/s Multimedia Protocol Adapter," ACM Computer Communication Review, vol. 23, No. 3, pp. 59-68, Jul. 1993.
Ed Anderson, et al.; "Performance of the CRAY T3E Multiprocessor," Proceedings of the 1997 ACM/IEEE conference on Supercomputing, pp. 1-17, San Jose, California; Nov. 16, 1997.
Edward D. Lazowska, David A. Patterson; "Computing Research: A Looming Crisis," ACM Computer Communication Review, vol. 35, No. 2, 2005, pp. 65-68, Jul. 2005.
Eric C. Cooper, et al.; "Protocol Implementation on the Nectar Communication Processor," ACM Computer Communication Review, vol. 20, No. 4, 10 pages, Sep. 1990.
Erich Ruetsche and Matthias Kaiserswerth; "TCP/IP on the Parallel Protocol Engine," Proceedings of the IFIP TC6/WG6.4 Fourth International Conference on High Performance Networking IV; pp. 119-134. Dec. 14, 1992.
F.F. Kuo; "The Aloha System," ACM Computer Communication Review, vol. 4, No. 1, pp. 5-8, Jan. 1974.
Gary S. Delp, et al.; "An Analysis of Memnet: An Experiment in High-Speed Shared-Memory Local Networking," ACM Computer Communication Review, vol. 18, No. 4, p. 165-174, Aug. 1988.
Gene Tsudik; "Message Authentication with One-Way Hash Functions," ACM Computer Communication Review, vol. 22, No. 5, pp. 29-38, Oct. 1992.
Gordon E. Moore; "Cramming more components onto integrated circuits," Electronics, vol. 38, No. 8, 4 pages, Apr. 1, 1965.
Greg Chesson; "The Evolution of XTP," Proceedings of the Third International Conference on High Speed Networking, pp. 1-10, Nov. 1991.
Greg Minshall, et al.; "Flow labelled IP over ATM: design and rationale ," ACM Computer Communication Review, vol. 36, No. 3, pp. 79-92, Jul. 2006.
Greg Regnier, et al.; ETA: Experience with an Intel Xeon Processor as a Packet Processing EngineIEEE Micro, vol. 24, No. 1, pp. 24-31, Jan. 1994.
Greg Regnier, et al.; "TCP Onloading for Data Center Servers," Computer, IEEE Computer Society, vol. 37, No. 11, pp. 48-58, Nov. 2004.
Gregory G. Finn; "An Integration of Network Communication with Workstation Architecture," ACM Computer Communication Review, vol. 21, No. 5, 12 pages, Oct. 1991.
Gregory G. Finn and Paul Mockapetris; "Netstation Architecture Multi-Gigabit Workstation Network Fabric," Proceedings of InterOp '94, Las Vegas, Nevada; pp. 1-9, May 1994.
Gregory L. Chesson; "Declaration of Dr Gregory L Chesson in *Alacritech* v. *Microsoft*," United States District Court, Northern District California, San Francisco Division, 289 pages, Feb. 4, 2005.
H. K. Jerry Chu; "Zero-Copy TCP in Solaris," Proceedings of the USENIX Annual Technical Conference, 13 pages, Jan. 1996.
H. Kanakia and D. Cheriton; "The VMP Network Adapter Board (NAB): High-Performance Network Communication for Multiprocessors," ACM Computer Communication Review, vol. 18, No. 4, pp. 175-187, Aug. 1988.
Harvey J. Wassermann, et al.; "Performance Evaluation of the SGI Origin2000: A Memory-Centric Characterization of LANL ASCI Applications," Proceedings of the 1997 ACM/IEEE conference on Supercomputing, pp. 1-11, San Jose, California; Nov. 16, 1997.
Humaira Kamal, et al.; "SCTP versus TCP for MPI," Proceedings of the 2005 ACM/IEEE conference on Supercomputing, Seattle, Washington, 14 pages, Nov. 12, 2005.
Ian Leslie and Derek R. McAuley; "Fairisle: An ATM Network for the Local Area," ACM Computer Communication Review, vol. 21, No. 4, pp. 327-336, Sep. 1991.
Ian M. Leslie, et al.; "The Architecture of the Universe Network," ACM Computer Communication Review, vol. 14, No. 2, pp. 2-9, Jun. 1984.

(56) References Cited

OTHER PUBLICATIONS

Ian Pratt and Keir Fraser; "Arsenic: A User-Accessible Gigabit Ethernet Interface," Proceedings of IEEE Infocom 2001, pp. 1-11; Apr. 22, 2001.
J. C. C Mogul; "The Case for Persistent-Connection HTTP," ACM Computer Communication Review, vol. 25, No. 4, pp. 299-313, Oct. 1995.
J. Carver Hill; "Synchronizing Processors with Memory-Content-Generated Interrupts," Communications of the ACM, vol. 16, No. 6, p. 350-351, Jun. 1973.
J. Evans and T. Buller; "The End of History," IEEE TCGN Gigabit Networking Workshop, 10 pages, Apr. 22, 2001.
J. Vis; "A Simple LAN Performance Measure," ACM Computer Communication Review, vol. 24, No. 1, pp. 7-11, Jan. 1994.
Jack B. Dennis and Earl C. Van Horn; "Programming Semantics for Multiprogrammed Computations," Communications of the ACM, vol. 9, No. 3, pp. 143-155, Mar. 1966.
Jeffrey C. Mogul; "TCP offload is a dumb idea whose time has come," Proceedings of HotOS IX: The 9th Workshop on Hot Topics in Operating Systems, pp. 26-30, May 18, 2003.
Jeffrey R. Michel; "The Design and Evaluation of an Off-Host Communications Protocol Architecture," MSci Thesis, University of Virginia, 144 pages, Aug. 1993.
Jenwei Hsieh, et al.; "Architectural and Performance Evaluation of GigaNet and Myrinet Interconnects on Clusters of Small-Scale SMP Servers," Proceedings of the 2000 ACM/IEEE conference on Supercomputing, Dallas, Texas, pp. 1-9, Nov. 4, 2000.
Jiuxing Liu, et al.; "Performance Comparison of MPI Implementations over InfiniBand, Myrinet and Quadrics," Proceedings of the 2003 ACM/IEEE conference on Supercomputing, Phoenix, Arizona, pp. 1-15, Nov. 15, 2003.
John M. McQuillan, et al.; "An Overview of the New Routing Algorithm for the ARPANET," Proceedings of the 6th Data Communications Symposium, pp. 54-60, Nov. 1979.
John Nagle; "Congestion Control in IP/TCP Internetworks," ACM Computer Communication Review, vol. 14, No. 4, p. 11-17, Oct. 1984.
John Salmon, et al.; "Scaling of Beowulf-class Distributed Systems," Proceedings of the 1998 ACM/IEEE Conference on Supercomputing, Orlando, Florida, pp. 1-18, Nov. 7, 1998.
Jon Crowcroft; "10 Networking Papers: Recommended Reading," ACM Computer Communication Review, vol. 36, No. 2, pp. 31-32, Apr. 2006.
Jon Crowcroft, Derek McAuley; "ATM: A Retrospective on Systems Legacy," ACM Computer Communication Review, vol. 32, No. 5, pp. 11-21, Nov. 2002.
Jonathan Kay and Joseph Pasquale; "The Importance of Non-Data Touching Processing Overheads in TCP/IP," ACM Computer Communication Review, vol. 23, No. 4, 10 pages, Oct. 1993.
Jonathan M. Smith and C. Brendan S. Traw; "Giving Applications Access to Gb/s Networking," IEEE Network, vol. 7, Issue 4, 14 pages, Jul. 1993.
Jonathan Smith; "The Influence of ATM on Operating Systems," ACM Computer Communication Review, vol. 32, No. 5, pp. 29-37, Nov. 2002.
Jonathan Stone, Craig Partridge; "When the CRC and TCP Checksum Disagree," ACM Computer Communication Review, vol. 30, No. 4, 11 pages, Oct. 2000.
Jose Carlos Sancho, et al.; "Quantifying the Potential Benefit of Overlapping Communication and Computation in Large-Scale Scientific Applications," Proceedings of the 2006 ACM/IEEE conference on Supercomputing, Tampa, Florida, 40 pages, Nov. 11, 2006.
Justin Hurwitz, Wu-chun Feng; "Initial End-to-End Performance Evaluation of 10-Gigabit Ethernet," Proceedings of the 11th Symposium on High Performance Interconnects, 6 pages, Aug. 20, 2003.
K. Kleinpaste, P. Steenkiste, B. Zill; "Software Support for Outboard Buffering and Checksumming," ACM Computer Communication Review, vol. 25, No. 4, pp. 87-98, Oct. 1995.
Ken Calvert; "Reflections on Network Architecture: an Active Networking Perspective," ACM Computer Communication Review, vol. 36, No. 2, pp. 27-30, Apr. 2006.
Kieran Mansley, et al.; "Getting 10 Gb/s from Xen," Euro-Par Conference 2007, Rennes, France, 10 pages, Aug. 28, 2007.
L. S. Brakmo, et al.; "TCP Vegas: New Techniques for Congestion Detection and Avoidance," ACM Computer Communication Review, vol. 24, No. 4, pp. 24-35, Oct. 1994.
M. Allman; "TCP Byte Counting Refinements," ACM Computer Communication Review, vol. 29, No. 3, pp. 14-22, Jul. 1999.
M. de Vivo, et al.; "Internet Vulnerabilities Related to TCP/IP and T/TCP," ACM Computer Communication Review, vol. 29, No. 1, pp. 81-85, Jan. 1999.
M. Kaiserswerth; "The Parallel Protocol Engine," IEEE/ACM Transactions in Networking vol. 1, Issue 6, pp. 650-663, Dec. 1993.
U.S. Appl. No. 13/789,353—Final Office Action dated Jul. 28, 2015, 36 pages.
U.S. Appl. No. 13/283,420—Final Office Action dated Jul. 22, 2015, 12 pages.
U.S. Appl. No. 12/964,642—Office Action dated Feb. 12, 2014, 54 pages.
U.S. Appl. No. 12/964,642—Response to Office Action dated Feb. 12, 2014 filed Jul. 30, 2014, 16 pages.
U.S. Appl. No. 13/789,353—Office Action dated Apr. 23, 2015, 89 pages.
U.S. Appl. No. 13/789,353—Response to Office Action dated Apr. 23, 2015 filed Jul. 13, 2015, 16 pages.
U.S. Appl. No. 13/283,420—Response to Office Action dated Dec. 3, 2014 filed Apr. 7, 2015, 13 pages.
U.S. Appl. No. 13/624,788—Office Action dated Aug. 1, 2014, 64 pages.
U.S. Appl. No. 13/624,788—Response to Office Action dated Aug. 1, 2014 filed Oct. 29, 2014, 14 pages.
U.S. Appl. No. 13/283,420—Response to Final Office Action dated Jul. 22, 2015 filed Sep. 14, 2015, 16 pages.
U.S. Appl. No. 13/283,420—Notice of Allowance dated Oct. 2, 2015, 17 pages.
U.S. Appl. No. 13/754,792—Office Action dated Dec. 18, 2015, 92 pages.
U.S. Appl. No. 13/671,434—Office Action dated Mar. 23, 2016, 73 pages.
U.S. Appl. No. 13/789,353—Response to Final Office Action dated Jul. 28, 2015, filed Sep. 28, 2015, 13 pages.
U.S. Appl. No. 13/789,353—Advisory Action dated Oct. 16, 2016, 6 pages.
U.S. Appl. No. 13/789,353—Response to Advisory Action dated Oct. 16, 2016, filed Oct. 27, 2016, 14 pages.
"NVIDIA Tesla GPUs to Communicate Faster Over Mellanox InfiniBand Networks," press release dated Nov. 25, 2009, Portland OR, 3 pp: <http://gpgpu.org/2009/11/25/nvidia-tesla-mellanox-infiniband>.
"NVIDIA GPUDirect™ Technology—Accelerating GPU-based Systems," Mellanox Tech. Brief, May 2010, 2pp: <http://www.mellanox.com/pdf/whitepapers/TB_GPU_Direct.pdf>.
Pope, S.L. et al., "Enhancing Distributed Systems with Low-Latency Netowrking," Olivetti and Oracle Research Laboratory, Cambridge Univ. May 1998, 12 pp: <http://www.cl.cam.ac.uk/research/dtg/www/publications/public/files/tr.98.7.pdf>.
Hodges, S.J. et al., "Remoting Peripherals using Memory-Mapped Networks," Olivetti and Oracle Research Laboratory, Cambridge Univ., 1998, 3 pp: <http://www.cl.cam.ac.uk/research/dtg/www/publications/public/files/tr.98.6.pdf>.
Bilic Hrvoye, et al.; "Deferred Segmentation for Wire-Speed Transmission of Large TCP Frames over Standard GbE Networks," Proceedings of the 9th Symposium on High Performance Interconnects, 5 pages, Aug. 22, 2001.
Bilic Hrvoye, et al.; "Presentation given at HOTI'01," 9th Symposium on High Performance Interconnects, 9 pages, Aug. 22, 2001.
Joe Touch, et al.; "Experiences with a Production Gigabit LAN," Gigabit Networking Workshop '97 Meeting, Kobe, Japan, 10 pages, Apr. 1997.

(56) References Cited

OTHER PUBLICATIONS

Joe Touch, et al.; "Host-based Routing Using Peer DMA," Gigabit Networking Workshop '97 Meeting, Kobe, Japan, 2 pages, Apr. 1997.
Geoffray P., "Protocol off-loading vs on-loading in high-performance networks," 14th Symposium on High Performance Interconnects, Aug. 23, 2006, 5pp.
Dickman, L., "Protocol OffLoading vs OnLoading in High Performance Networks," 14th Symposium on High Performance Interconnects, Aug. 23, 2006, 8pp.
Mogul J., "TCP offload is a dumb idea whose time has come," USENIX Assoc., Proceedings of HotOS IX: The 9th Workshop on Hot Topics in Operating Systems, May 2003, pp. 24-30.
Petrini F., "Protocol Off-loading vs On-loading in High-Performance Networks," 14th Symposium on High Performance Interconnects, Aug. 23, 2006, 4pp.
Regnier G., "Protocol Onload vs. Offload," 14th Symposium on High Performance Interconnects, Aug. 23, 2006, 1pp.
Montry G., OpenFabrics Alliance presentation slides, 14th Symposium on High Performance Interconnects, Aug. 23, 2006, 8pp.
A. Edwards, et al.; "User-Space Protocols Deliver High Performance to Applications on a Low-Cost Gb/s LAN," ACM Computer Communication Review, vol. 24, No. 4, pp. 14-23, Oct. 1994.
A. Edwards, S. Muir; "Experiences Implementing a High-Performance TCP in User-Space," ACM Computer Communication Review, vol. 25, No. 4, pp. 196-205, Oct. 1995.
A. Romanow and S. Floyd; "The Dynamics of TCP Traffic over ATM Networks," ACM Computer Communication Review, vol. 24, No. 4, pp. 79-88, Oct. 1994.
Andrew D. Birrell, et al.; "Grapevine: An Exercise in Distributed Computing," Communications of the ACM, vol. 25, Issue 4, pp. 260-274, Apr. 1982.
Andy Currid; "TCP Offload to the Rescue," ACM Queue, vol. 2, No. 3, pp. 58-65, May 1, 2004.
B. Leslie, et al.; "User-level device drivers: Achieved performance," J. Comput. Sci. & Technol., vol. 20, pp. 1-17, Sep. 2005.
Babak Falsafi, et al.; "Application-Specific Protocols for User-Level Shared Memory," Proceedings of the 1994 conference on Supercomputing, pp. 380-389, Washington D.C.; Nov. 14, 1994.
Boon S. Ang, et al.; "StarT-Voyager: A Flexible Platform for Exploring Scalable SMP Issues," Proceedings of the 1998 ACM/IEEE conference on Supercomputing, Orlando, Florida, 19 pages, Nov. 7, 1998.
Bruce Lowekamp, et al.; "Topology Discovery for Large Ethernet Networks," ACM Computer Communication Review, vol. 31, No. 4, pp. 237-248, Oct. 2001.
Bruce S. Davie; "A Host-Network Interface Architecture for ATM," ACM Computer Communication Review, vol. 21, No. 4, pp. 307-315, Sep. 1991.
C. A. Thekkath, et al.; "Implementing Network Protocols at User Level," ACM Computer Communication Review, vol. 23, No. 4, pp. 64-132, Oct. 1993.
C. Brendan S. Traw, et al.; "A High-Performance Host Interface for ATM Networks," ACM Computer Communication Review, vol. 21, No. 4, pp. 317-325, Sep. 1991.
C. Kline; "Supercomputers on the Internet: A Case Study," ACM Computer Communication Review, vol. 17, No. 5, pp. 27-33, Aug. 1987.
C. Partridge, J. Hughes, J. Stone; "Performance of Checksums and CRCS over Real Data," ACM Computer Communication Review, vol. 25, No. 4, pp. 68-76, Oct. 1995.
C. Traw and J. Smith; "Hardware/Software organization of a high performance ATM host interface," IEEE Journal on Selected Areas in Communications, pp. 1-22, Feb. 1993.
Charles Kalmanek; "A Retrospective View of ATM," ACM Computer Communication Review, vol. 32, No. 5, pp. 13-19, Nov. 2002.
Charles P. Thacker and Lawrence C. Stewart; "Firefly: a Multiprocessor Workstation," ACM Operating Systems Review, vol. 21, Issue 4, pp. 164-172, Oct. 1987.

Cheng Jin, et al.; "FAST TCP: Motivation, Architecture, Algorithms, Performance," Proceedings of IEEE Infocom 2004, 21 pages, Mar. 7, 2004.
Chi-Chao Chang, et al.; "Low-Latency Communication on the IBM RISC System/6000 SP," Proceedings of the 1996 ACM/IEEE conference on Supercomputing, Pittsburgh, pp. 1-17, Nov. 17, 1996.
Chris Maeda, Brian Bershad; "Protocol Service Decomposition for High-Performance Networking," ACM Operating Systems Review, vol. 27, Issue 5, 12 pages, Dec. 1993.
Christopher A. Kent, Jeffrey C. Mogul; "Fragmentation Considered Harmful," ACM Computer Communication Review, vol. 17, No. 5, pp. 75-87, Oct. 1987.
Craig Partridge; "How Slow is One Gigabit Per Second ?," ACM Computer Communication Review, vol. 20, No. 1, pp. 44-53, Jan. 1990.
D. D. Clark and D. L. Tennenhouse; "Architectural Considerations for a New Generation of Protocols," ACM Computer Communication Review, vol. 20, No. 4, pp. 200-208, Sep. 1990.
D. L.Tennenhouse, D. J. Wetherall; "Towards an Active Network Architecture," ACM Computer Communication Review, vol. 26, No. 2, pp. 5-18, Apr. 1996.
Danny Cohen, et al.; "Use of message-based multicomputer components to construct gigabit networks," ACM Computer Communication Review, vol. 23, No. 4, p. 32-44, Jul. 1993.
Danny Cohen, Gregory Finn, Robert Felderman, Annette DeSchon; "ATOMIC: A Local Communication Network Created Through Repeated Application of Multicomputing Components," Provided by Authors, pp. 1-21, Jan. 10, 1992.
Danny Cohen, Gregory Finn, Robert Felderman, Annette DeSchon; "ATOMIC: A High-Speed Local Communication Architecture," Journal of High Speed Networks; pp. 1-11, Jan. 3, 1994.
David A. Borman; "Implementing TCP/IP on a Cray computer," ACM Computer Communication Review, vol. 19, No. 2, pp. 11-15, Apr. 1989.
David D. Clark; "The Design Philosophy of the DARPA Internet Protocols," ACM Computer Communication Review, vol. 18, No. 4, pp. 102-111, Aug. 1988.
David D. Clark, et al.; "An Analysis of TCP Processing Overhead," IEEE Communications Magazine, vol. 27, No. 6, pp. 23-29, Jun. 1989.
David R. Boggs, et al.; "Measured Capacity of an Ethernet: Myths and Reality," ACM Computer Communication Review, vol. 18, No. 4, pp. 222-234, Aug. 1988.
David R. Cheriton; "Sirpent: A High-Performance Internetworking Approach," ACM Computer Communication Review, vol. 19, No. 4, pp. 158-169, Sep. 1989.
David Wetherall; "10 Networking Papers: Readings for Protocol Design," ACM Computer Communication Review, vol. 36, No. 3, pp. 77-78, Jul. 2006.
Derek McAuley, Rolf Neugebauer; "A case for Virtual Channel Processors," Proceedings of the ACM SIGCOMM 2003 Workshops, pp. 237-242, Aug. 2003.
Derek Robert McAuley; "Protocol Design for High Speed Networks," PhD Thesis, University of Cambridge, 104 pages, Sep. 1989.
E. Blanton and M. Allman; "On Making TCP More Robust to Packet Reordering," ACM Computer Communication Review, vol. 32, No. 1, pp. 20-30, Jan. 2002.
M.V. Wilkes and R.M. Needham; "The Cambridge Model Distributed System," ACM SIGOPS Operating Systems Review, vol. 14, Issue 1, pp. 21-29, Jan. 1980.
Margaret L. Simmons and Harvey J. Wasserman; "Performance Comparison of the Cray-2 and Cray X-MP/416 Supercomputers," Proceedings of the 1988 ACM/IEEE conference on Supercomputing, pp. 288-295, Orlando, Florida; Nov. 12, 1988.
Mark David Hayter; "A Workstation Architecture to Support Multimedia," PhD Thesis, University of Cambridge, 111 pages, Sep. 1993.
Mark Hayter, Derek McAuley; "The Desk Area Network," ACM Operating Systems Review, vol. 25, Issue 4, pp. 1-11, Oct. 1991.
Marvin Zelkowitz; "Interrupt Driven Programming," Communications of the ACM, vol. 14, No. 6, p. 417-418, Jun. 1971.

(56) References Cited

OTHER PUBLICATIONS

Matthias Kaiserswerth; "The Parallel Protocol Engine," IEEE/ACM Transactions in Networking vol. 1, Issue 6, pp. 650-663, Dec. 1993.
Mengjou Lin, et al.; "Performance of High-Speed Network I/O Subsystems: Case Study of a Fibre Channel Network," Proceedings of the 1994 conference on Supercomputing, Washington D.C.; pp. 174-183, Nov. 14, 1994.
Michael J. Dixon; "System support for multi-service traffic," University of Cambridge Computer Laboratory Technical Report, No. 245, pp. 1-108, Jan. 1992.
Michael S. Warren, et al.; "Avalon: An Alpha/Linux Cluster Achieves 10 Gflops for $150k," Proceedings of the 1998 ACM/IEEE conference on Supercomputing, Orlando, Florida, pp. 1-10, Nov. 7, 1998.
Murali Rangarajan, et al.; "TCP Servers: Offloading TCP Processing in Internet Servers. Design, Implementation, and Performance," Technical Report DCR-TR-481, Computer Science Department, Rutgers University, 14 pages, Mar. 2002.
Nanette J. Boden, et al.; "Myrinet: A Gigabit-per-Second Local-Area Network," Draft of paper published in IEEE Micro, vol. 15, No. 1, pp. 1-15, Nov. 16, 1994.
Nr Adiga, et al.; "An Overview of the BlueGene/L Supercomputer," Proceedings of the 2002 ACM/IEEE conference on Supercomputing, pp. 1-22, Baltimore; Nov. 16, 2002.
O. Angin, et al.; "Report on the 5th IFIP Internation Workshop on Quality of Service (IWQOS 97)," ACM Computer Communication Review, vol. 27, No. 3, pp. 100-117, Jul. 1997.
P. Balaji, et al.; "Head-to-TOE Evaluation of High-Performance Sockets Over Protocol Offload Engines," Proceedings of the IEEE International Conference on Cluster Computing, 2005, pp. 1-10, Sep. 2005.
P. Druschel, et al.; "Experiences with a High-Speed Network Adaptor: A Software Perspective," ACM Computer Communication Review, vol. 24, No. 4, pp. 2-13, Oct. 1994.
P. Kermani and L. Kleinrock; "Virtual cut-through: A new computer communciation switching technique," Computer Networks, vol. 3, No. 4, pp. 267-286, Sep. 1979.
Parry Husbands and James C. Hoe; "MPI-StarT: Delivering Network Performance to Numerical Applications," Proceedings of the 1998 ACM/IEEE conference on Supercomputing, Orlando, Florida, 15 pages, Nov. 7, 1998.
Pasi Sarolahti, et al.; "F•RTO: An Enhanced Recovery Algorithm for TCP Retransmission Timeouts," ACM Computer Communication Review, vol. 33, No. 2, pp. 51-63, Apr. 2003.
Patrick Crowley, et al.; "Characterizing Processor Architectures for Programmable Network Interfaces," Proceedings of the 14th international conference on Supercomputing, Santa Fe, New Mexico, 12 pages, May 8, 2000.
Patrick Geoffray; "A Critique of RDMA," HPCWire article: http://www.hpcwire.com/features/17886984.html, 7 pages, Aug. 18, 2006.
Paul E. McKenney and Ken F. Dove; "Efficient Demultiplexing of Incoming TCP Packets," ACM Computer Communication Review, vol. 22, No. 4, pp. 269-279, Oct. 1992.
Paul Ronald Barham; "Devices in a Multi-Service Operating System," PhD Thesis, University of Cambridge, 142 pages, Jul. 1996.
Paul V. Mockapetris, Kevin J. Dunlap; "Development of the Domain Name System," ACM Computer Communication Review, vol. 18, No. 4, pp. 112-122, Aug. 1988.
Peter Druschel and Larry L. Peterson; "Fbufs: A High-Bandwidth Cross-Domain Transfer Facility," ACM Operating Systems Review, vol. 27, Issue 5, pp. 189-202, Dec. 1993.
Peter Steenkiste; "Analyzing Communication Latency using the Nectar Communication Processor," ACM Computer Communication Review, vol. 22, No. 4, pp. 199-209, Oct. 1992.
Philip Buonadonna, et al.; "An Implementation and Analysis of the Virtual Interface Architecture," Proceedings of the 1998 ACM/IEEE conference on Supercomputing, Orlando, Florida, 20 pages, Nov. 7, 1998.
Piyush Shivam, et al.; "EMP: Zero-copy OS-bypass NIC-driven Gigabit Ethernet Message Passing," Proceedings of the 2001 ACM/IEEE conference on Supercomputing, Denver, CO, pp. 1-8, Nov. 10, 2001.
R. Braden, et al.; "Computing the Internet Checksum," ACM Computer Communication Review, vol. 19, No. 2, pp. 86-94, Apr. 1989.
R. Bush, D. Meyer; "Some Internet Architectural Guidelines and Philosophy," IETF Network Working Group, Request for Comments: 3439, pp. 1-25, Dec. 2002.
R. J. Black, I.Leslie, and D. McAuley; "Experiences of Building an ATM Switch for the Local Area," ACM Computer Communication Review, vol. 24, No. 4, pp. 158-167, Oct. 1994.
Raj K. Singh, et al.; "A Programmable HIPPI Interface for a Graphics Supercomputer," Proceedings of the 1993 ACM/IEEE conference on Supercomputing, pp. 124-132, Portland, Oregon; Nov. 15, 1993.
Raj K. Singh, et al.; "A Programmable Network Interface for a Message-Based Multicomputer," ACM Computer Communication Review, vol. 24, No. 3, pp. 8-17, Jul. 1994.
Robert M. Brandriff, et al.; "Development of a TCP/IP for the IBM/370," ACM Computer Communication Review, vol. 15, No. 4, pp. 2-8, Sep. 1985.
Robert M. Metcalfe and David R. Boggs; "Ethernet: distributed packet switching for local computer networks," Communications of the ACM, vol. 19, Issue 7, pp. 395-404, Jul. 1976.
Robert Ross, et al.; "A Case Study in Application I/O on Linux Clusters," Proceedings of the 2001 ACM/IEEE conference on Supercomputing, Denver, CO, 17 pages, Nov. 10, 2001.
S. L. Pope, et al.; "Enhancing Distributed Systems with Low-Latency Networking," Parallel and Distributed Computing and Networks, Brisbane, Australia, pp. 1-12, Dec. 1998.
Sally Floyd; "TCP and Explicit Congestion Notification," ACM Computer Communication Review, vol. 24, No. 5, p. 8-23, Oct. 1994.
Sayantan Sur, et al.; "High-Performance and Scalable MPI over InfiniBand with Reduced Memory Usage: An In-Depth Performance Analysis," Proceedings of the 2006 ACM/IEEE conference on Supercomputing, Tampa, Florida, 13 pages, Nov. 11, 2006.
Srihari Makineni and Ravi Iyer; "Architectural Characterization of TCP/IP Packet Processing on the Pentium M Processor," Proceedings of the 10th International Symposium on High Performance Computer Architecture, 11 pages, Feb. 14, 2004.
Steve Muir and Jonathan Smith; "Piglet: A Low-Intrusion Vertical Operating System," Technical Report MS-CIS-00-04, University of Pennsylvania, 2000, pp. 1-15, Jan. 2000.
Steven J. Sistare, Christopher J. Jackson; "Ultra-High Performance Communication with MPI and the Sun Fire Link Interconnect," Proceedings of the 2002 ACM/IEEE conference on Supercomputing, p. 1-15, Baltimore; Nov. 16, 2002.
Steven Pope, David Riddoch; "10Gb/s Ethernet Performance and Retrospective," ACM Computer Communication Review, vol. 37, No. 2, pp. 89-92, Mar. 19, 2007.
Stuart Wray, et al.; "The Medusa Applications Environment," Proceedings of the International Conference on Multimedia Computing and Systems, Boston, MA, 9 pages, May 1994.
Sumitha Bhandarkar, et al.; "LTCP: Improving the Performance of TCP in Highspeed Networks," ACM Computer Communication Review, vol. 36, No. 1, pp. 41-50, Jan. 2006.
Thomas Sterling, et al.; "Beowolf: A Parallel Workstation for Scientific Computation," Proceedings of the 24th International Conference on Parallel Processing, pp. 1-4, Aug. 1995.
Thorsten von Eicken, et al.; "U-Net: A User-Level Network Interface for Parallel and Distributed Computing," ACM Operating Systems Review, vol. 29, Issue 5, pp. 40-53, Dec. 1995.
Tom Kelly; "Scalable TCP: Improving Performance in Highspeed Wide Area Networks," ACM Computer Communication Review, vol. 33, No. 2, pp. 83-91, Apr. 2003.
V. Cert, et al.; "Proposal for an International End-to-End Protocol," ACM Computer Communication Review, vol. 6 No. 1, pp. 63-89, Jan. 1976.
V. Jacobson; "Congestion Avoidance and Control," ACM Computer Communication Review, vol. 18, No. 4, pp. 157-173, Aug. 1988.

(56) References Cited

OTHER PUBLICATIONS

Various forum members; "MPI: A Message-Passing Interface Standard," Message-Passing Interface Forum, University of Tennessee, Knoxville, 236 pages, May 5, 1994.

* cited by examiner

ENCAPSULATED ACCELERATOR

CROSS-REFERENCE TO RELATED APPLICATION

This application is a continuation of prior U.S. application Ser. No. 12/964,642, filed 9 Dec. 2010, entitled ENCAPSULATED ACCELERATOR," by Steven L. Pope, which is incorporated herein by reference in its entirety.

BACKGROUND OF THE INVENTION

This invention relates to a network interface device including one or more accelerator units and a data processing system comprising such a network interface device.

Achieving the right balance between the functionality/performance of a network interface device and power/cost considerations has long been the subject of debate, particularly in terms of the choice as to which aspects of the communication and other protocols that might operate over the device should be accelerated in hardware at the network interface device. Such acceleration functions are referred to as "offloads" because they offload processing that would otherwise be performed at the CPU of the host system onto the network interface device.

Usually the offload is chosen to be a specific function of the network protocol stack that is amenable to hardware acceleration. Typically, this includes the data integrity aspects of a protocol such as TCP/IP checksums, iSCSI CRC digests, or hashing or lookup operations such as the parsing of data flows onto virtual interface endpoints. Whether or not a particular function of a network protocol is amenable to hardware acceleration depends on several factors, which will now be discussed.

A. Whether or not a function may be performed based solely on the contents of an individual network packet. This property is termed 'stateless' when applied to an offload. A stateless offload requires little local storage at the network interface—for example, TCP/IP checksum insertion on transmission requires buffering of a single Ethernet frame. In contrast, a statefull operation may require the interface to store state relative to a large number of network flows over a large number of network packets. For example, an Ethernet device that performs reassembly of TCP/IP flows into units which are larger than the MSS (Maximum Segmentation Size) would be required to track many thousands of packet headers. Statefull protocol offloads can therefore require the network interface to have significant amounts of fast memory which is both expensive and power hungry.

B. Whether or not a function may be directly implemented in parallel logic operating over a single or small number of passes of the data contained within the network packet. This property is termed tractable. For example, the AES GCM cryptographic algorithm has been designed such that the internal feedback loop may be 'unrolled' when implemented. This enables a hardware designer to scale an AES GCM engine's performance (bandwidth) by simply adding more gates in silicon, which by Moore's Law can be readily accommodated as higher speeds are required. In contrast, the Triple-DES cryptographic algorithm may not be unrolled into parallel hardware. This requires an implementation to iterate repeatedly over the data. In order to improve the performance of an iterative algorithm, the implementation must scale in clock frequency, which is becoming increasingly difficult on silicon based processes. Being untractable, iterative algorithms are more difficult to implement as hardware offloads.

C. Whether or not a protocol function has been designed for hardware execution. Generally, the specification of a hardware protocol will be unambiguous and strictly versioned. For example, Ethernet line encodings are negotiated at link bring up time and, once settled upon, are strictly adhered to. Changing encoding requires a re-negotiation. By contrast, the TCP protocol that has not been specifically designed for execution at hardware is specified by many 10s of RFCs (Request For Comments). These specifications often present alternative behaviours, and are sometimes conflicting, but together define the behaviour of a TCP endpoint. A very basic TCP implementation could be made through adherence to a small number of the RFCs, but such a basic implementation would not be expected to perform well under challenging network conditions. More advanced implementations of the TCP protocol require adherence to a much larger number of the RFCs, some of which specify complex responses or algorithms that are to operate on the same wire protocol and that would be difficult to implement in hardware. Software-oriented specifications are also often in a state of continued development, which is sometimes achieved without strict versioning. As such, software-oriented specifications are usually best expressed in high level programming languages such as C, which cannot be easily parallelized and converted to hardware logic representation.

D. Whether or not a function is well known and commonly used enough for it to be considered for implementation in a commercial network interface device. Often, application specific functions (such as normalisation of stock exchange data feeds) are only known to practitioners of their field and are not widely used outside of a few companies or institutions. Since the cost of implementing a function in silicon is tremendously expensive, it might not be commercially viable to implement in hardware those functions whose use is limited to a small field.

In summary, features that are typically chosen to be implemented as offloads in hardware are those which are stateless, tractable, hardware oriented, well known and commonly used.

Unfortunately, there are number of functions which do not meet these criteria and yet being performance-sensitive greatly benefit from being accelerated in hardware offloads. For example, in the Financial Services sector it is often the case that large numbers of data feeds must be aggregated together and normalized into a unified data model. This normalisation process would typically unify the feed data into a database by, for example, time representation or stock symbol representation, which would require hundreds of megabytes of data storage to implement in hardware. Other niche application spaces that greatly benefit from being accelerated in hardware offloads include: event monitoring equipment in high energy particle colliders, digital audio/video processing applications, and in-line cryptographic applications.

Often the hardware suitable for accelerating protocol functions in such niche application spaces does not exist because it is simply not commercially viable to develop. In other cases, bespoke network interface hardware has been developed which implement the application specific offloads required but at significant cost, such as with the Netronome Network Flow Engine NFE-3240. Additionally, many bespoke hardware platforms lag significantly behind the performance of commodity silicon. For instance, 40 Gb/s Ethernet NICs are now available and the shift to 100 Gb/s commodity products is quickly approaching, yet most bespoke NICs based upon an FPGA are only capable of 1 Gb/s.

To give an example, the hardware offloads for a normalisation process in the Financial Services sector would typically be implemented at a NIC based upon an FPGA (Field-Programmable Gate Array) controller that includes the features of a regular network interface as well as the custom offloads. This requires the FPGA controller to define, for instance, the Ethernet MACs and PCIe core, as well as the custom offload engines and would typically be provided with a set of bespoke drivers that provide a host system with access to the hardware offloads of the FPGA. This implementation strategy is problematic because the speed and quality of FPGA chips for NICs is not keeping pace with the innovation of commodity NICs that use application specific integrated circuits (ASICs). In fact, the design and implementation of the PCIe core is often the rate determining factor in bringing a custom controller to market and FPGA vendors typically lag the commodity silicon designs by a year.

Furthermore, the problem is becoming more acute as systems become more integrated and demand that NICs offer more commodity features such as receive-side scaling (RSS), support for multiple operating systems, network boot functions, sideband management, and virtualisation acceleration (such as the hardware virtualisation support offered by the PCI-SIG I/O Virtualisation standards). This is being driven by the increasing use of virtualisation in server environments and data centres, and, in particular, the increasing use of highly modular blade servers.

A data processing system 100 is shown in FIG. 1 of the type that might be used in the Financial Services sector to provide hardware accelerated normalisation of certain data feeds. The data processing system 100 includes a bespoke network interface device (NIC) 101 coupled to a host system 102 over communications bus 103. NIC 101 has two physical Ethernet ports 104 and 105 connected to networks 106 and 107, respectively (networks 106 and 107 could be the same network). The bespoke NIC 101 is based around an FPGA controller 108 that provides offloads 109 and 110 in hardware. The offloads could, for example, perform normalisation of data feeds received at one or both of ports 104 and 105. Typically the NIC will also include a large amount of high speed memory 111 in which the data processed by the hardware offloads can be stored for querying by software entities running at host system 102.

Generally, host system 102 will have an operating system that includes a kernel mode driver 112 for the bespoke NIC 101, and a plurality of driver libraries 115 by means of which other software 116 at user level 114 is configured to communicate with the NIC 101. The driver libraries could be in the kernel 113 or at user level 114. In the case of a host system in the Financial Services sector, software 116 might be bank software that includes a set of proprietary trading algorithms that trade on the basis of data generated by the offloads 109 and 110 and stored at memory 111. For example, memory 111 could include a database of normalised stock values, the normalisation having been performed by the offloads 109 and 110 in accordance with known database normalisation methods. Typically, host system 102 will also include management software 117 by means of which the NIC can be managed.

Since NIC 101 provides a customised function set, the vendor of the NIC will provide the driver and driver libraries so as to allow the software 116 to make use of the custom functions of the NIC. Any software running at user level on the host system must therefore trust the vendor and the integrity of the driver and driver libraries it provides. This can be a major risk if the software 116 includes proprietary algorithms or data models that are valuable to the owner of the data processing system. For example, the data processing system could be a server of a bank at which high frequency trading software 116 is running that includes very valuable trading algorithms, the trades being performed at an exchange remotely accessible to the software over network 106 or 107 by means of NIC 101. Since all data transmitted to and from the host system over the NIC traverses the kernel mode vendor driver 112 and vendor libraries 115, the software 116 including its trading algorithms are accessible to malicious or buggy code provided by the NIC vendor. It would be an onerous job for the bank to check all the code provided by the NIC vendor, particularly since the drivers are likely to be regularly updated as bugs are found and updates to the functionality of the NIC are implemented. Furthermore, a NIC vendor may require that a network flow is established between the management software of the NIC 117 to the NIC vendor's own data centres. For example, this can be the case if the NIC is a specialised market data delivery accelerator and the market data is being aggregated from multiple exchanges at the vendor's data centers. With the structure shown in FIG. 1, the bank would not be able to prevent or detect the NIC vendor receiving proprietary information associated with software 116.

Financial institutions and other users of bespoke NICs that need to make use of hardware offloads are therefore currently left with no choice but to operate NICs that offer a level of performance behind that available in a commodity NIC and to trust any privileged code provided by the NIC vendor that is required for operation of the NIC.

There have been efforts to arrange network interface devices to utilise the processing power of a GPGPU (General Purpose GPU) provided at a peripheral card of a data processing system. For example, an Infiniband NIC can be configured to make peer-to-peer transfers with a GPGPU, as announced in the press release found at:
http://gpgpu.org/2009/11/25/nvidia-tesla-mellanox-infiniband
and the Nvidia GPUDirect technology is described at:
http://www.mellanox.com/pdf/whitepapers/TB_GPU_Direct.pdf.

However, despite offering acceleration for particular kinds of operations (such as floating point calculations), GPGPUs are not adapted for many kinds of operations for which hardware acceleration would be advantageous. For example, a GPGPU would not be efficient at performing the normalisation operations described in the above example. Furthermore, in order for a NIC to make use of a GPGPU, the NIC typically requires an appropriately configured kernel-mode driver and such an arrangement therefore suffers from the security problems identified above.

Other publications that relate to memory-mapped data transfer between peripheral cards include "Remoting Peripherals using Memory-Mapped Networks" by S. J. Hodges et al. of the Olivetti and Oracle Research Laboratory, Cambridge University Engineering Department (a copy of the paper is available at
http://www.cl.cam.ac.uk/research/dtg/www/publications/public/files/tr.98.6.pdf),
and "Enhancing Distributed Systems with Low-Latency Networking", by S. L. Pope et al. of the Olivetti and Oracle Research Laboratory, Cambridge University Engineering Department (a copy of the paper is available at
http://www.cl.cam.ac.uk/research/dtg/www/publications/public/files/tr.98.7.pdf).

There is therefore a need for an improved network interface device that provides a high performance architecture for custom hardware offloads and an secure arrangement for a data processing system having a network interface device that includes custom hardware offloads.

SUMMARY OF THE INVENTION

According to a first aspect of the present invention there is provided a data processing system comprising a host computer system and a network interface device for connection to a network, the host computer system and network interface device being coupled together by means of a data bus, and: the network interface device comprising: a controller unit having a first data port for connection to a network, a second data port, and a data bus interface connected to said data bus, the controller unit being operable to perform, in dependence on the network endpoints to which data packets received at the network interface device are directed, switching of data packets between the first and second data ports and communication queues at the host computer system; and an accelerator module having a first medium access controller coupled to said second data port of the controller unit and a processor operable to perform one or more functions in hardware on data packets received at the accelerator module, the said first medium access controller being operable to support one or more first network endpoints; the host computer system supporting: a plurality of guest software domains including a first guest software domain having an application; and a privileged software domain configured to present a virtual operating platform to said plurality of guest domains, the privileged software entity including a first software driver for the controller unit but not including a second software driver for the accelerator module; wherein the application is configured to access the accelerator module by means of one or more first data packets formed in accordance with a predetermined network protocol and directed to one or more of the first network endpoints.

Preferably, the plurality of guest software domains includes a second guest software domain having a driver library for said accelerator module, the driver library supporting a second network endpoint and the privileged software domain being configured so as to allow the application to access the driver library by means of one or more second data packets directed to said second network endpoint, the second data packets being formed in accordance with the predetermined network protocol. Preferably, the driver library is configured to manage the accelerator module by means of driver commands encapsulated within data packets of the predetermined network protocol and directed to one or more of the first network endpoints.

Preferably, the first guest software domain includes a communications library configured to translate send and receive requests by the application into the transmission and reception of data packets formed in accordance with the predetermined network protocol.

Suitably, the accelerator module further comprises a memory configured for storing data generated by the said one or more functions performed by the processor, and the application is configured to access said memory by means of one or more read requests encapsulated in one or more first data packets formed in accordance with the predetermined network protocol.

The privileged software domain could be a hypervisor or virtual machine monitor.

The first software driver could be integral with the kernel level code of the hypervisor or virtual machine monitor.

Suitably, the predetermined network protocol is UDP/IP and the network endpoints can be identified by IP addresses. Suitably, the network interface device is an Ethernet network interface device and the first network endpoint can be identified by an Ethernet address.

Suitably, the application is a trading platform configured to perform trades at one or more financial exchanges accessible by means of the network interface device.

Preferably, the controller unit is configured to forward data packets received at the second data port to the accelerator module over the first data port only if those data packets are directed to one of the one or more first network endpoints.

According to a second aspect of the present invention there is provided a network interface device comprising: a controller unit having a first data port for connection to a network, a second data port, and a data bus interface for connection to a host computer system, the controller unit being operable to perform, in dependence on the network endpoints to which data packets received at the network interface device are directed, switching of data packets between the first and second data ports and the data bus interface; and an accelerator module having a first medium access controller coupled to said second data port of the controller unit and a processor operable to perform one or more functions in hardware on data packets received at the accelerator module; wherein said first medium access controller is operable to support one or more first network endpoints such that, in use, data packets identified by the controller unit as being directed to said first network endpoints are sent over the second data port to the accelerator module.

The said one or more functions performed by the processor could be non-communications functions. Suitably, the said one or more functions performed by the processor do not include functions relating to the performance of network communications protocols in use at the network interface device. The one or more functions performed by the processor could include one or more of: normalisation of financial information prior to storage at a memory of the accelerator module or transmission to a host computer system accessible over the data bus interface; serialisation of trades directed to a financial exchange; analysis of scientific data; digital audio and/or video processing; and in-line cryptographic functions.

Preferably, the first data port of the network interface device includes a medium access controller coupled to a physical layer transceiver.

Preferably, the second data port of the network interface device includes a second medium access controller coupled to a second serial interface device, and the first medium access controller of the accelerator module is coupled to the second data port by means of a first serial interface device, said first and second serial interface devices being connected so as to allow the communication of data between the second data port and the accelerator module. Alternatively, the second data port of the network interface device includes a second medium access controller coupled to a second physical layer transceiver, and the first medium access controller of the accelerator module is coupled to the second data port by means of a first physical layer transceiver, said first and second physical layer transceivers being connected so as to allow the communication of data between the second data port and the accelerator module.

The controller unit and the accelerator module could be provided at separate peripheral devices and the controller unit is coupled to the accelerator module by a connection between the first serial interface device or first physical layer transceiver and the second serial interface device or second physical layer transceiver.

The network interface device could further comprise: a second media access controller; and at the accelerator module, a DMA controller and a data bus interface; wherein the controller unit is configured to provide a virtual interface of the network interface device that includes said second media access controller but not a physical layer transceiver, and the DMA interface is configurable so as to allow the accelerator module to exchange data with said virtual interface of the network interface device over a DMA channel.

The network interface device could further comprise a data bus bridge arranged for connecting the data bus interface of the hardware accelerator and the data bus interface of the controller unit to a data bus.

The controller unit and the accelerator module could be provided at separate peripheral devices and their respective data bus interfaces are configured for connection to a data bus.

Suitably, the data bus is a PCIe data bus and the virtual interface supports one or more SR-IOV or MR-IOV virtual configurations.

Suitably, the accelerator module further comprises a memory configured for storing data generated by the said one or more functions performed by the processor. Suitably, the accelerator module is operable to receive data packets from a host computer system accessible over the data bus interface and the accelerator module is configured to, in response to receiving a data packet including a read request directed to the memory, respond to the read request by encapsulating the requested data in one or more data packets for transmission to a network endpoint identified in the read request. Suitably, the accelerator module is configured to respond only to read requests received from a predetermined set of one or more network endpoints or over a predetermined set of one or more DMA channels.

The first medium access controller could be an Ethernet MAC and the first network endpoint identified by an Ethernet address.

The processor could be an FPGA integrated circuit.

According to a third aspect of the present invention there is provided a network interface device comprising: a hardware interface for receiving an accelerator module; a DMA interface; a controller unit having a data port for connection to a network by means of a first medium access controller and a physical layer transceiver, and being configured to provide a virtual interface of the network interface device that includes a second media access controller but not a second physical layer transceiver and is associated with a DMA channel established over the DMA interface; and a data bus bridge connected to the hardware interface and the controller unit and configured for connection to a host computer system;

wherein the controller unit is operable to perform, in dependence on the network endpoints to which data packets received at the network interface device are directed, switching of data packets between the data port, the virtual interface and the data bus bridge such that, in use with an accelerator module at the hardware interface, data packets identified as being directed to a network endpoint associated with the accelerator module are sent over a DMA channel associated with the virtual interface and established between the virtual interface and the accelerator module.

BRIEF DESCRIPTION OF THE DRAWINGS

The present invention will now be described by way of example with reference to the accompanying drawings, in which.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention provides solutions to the problems identified in the prior art by offering a novel network interface device and data processing system architecture. A network interface device (NIC) configured in accordance with the present invention is not limited to providing an interface to a particular network fabric, having a particular kind of interface to a host system, or to supporting a particular set of network protocols. For example, such a NIC could: be configured for operation with an Ethernet network, IEEE 802.11 network or a FibreChannel network; interface to a host system over a PCIe, PCI-X, or HTX bus; support communications over UDP, TCP/IP, or IPsec. A host system could be any kind of computer system at which a network interface device can be supported, such as a server. A host system comprising a network interface device will be referred to herein as a data processing system. Note that a network interface device configured in accordance with the present invention need not be provided as a device for connection to an expansion slot (e.g. PCIe) or communications port (e.g. eSATA) of a host system and could form part of the host system. For example, the network interface device could be located at the motherboard of a host system. The network interface device is connected to the host system by means of an internal or external communications bus.

Figure 1:
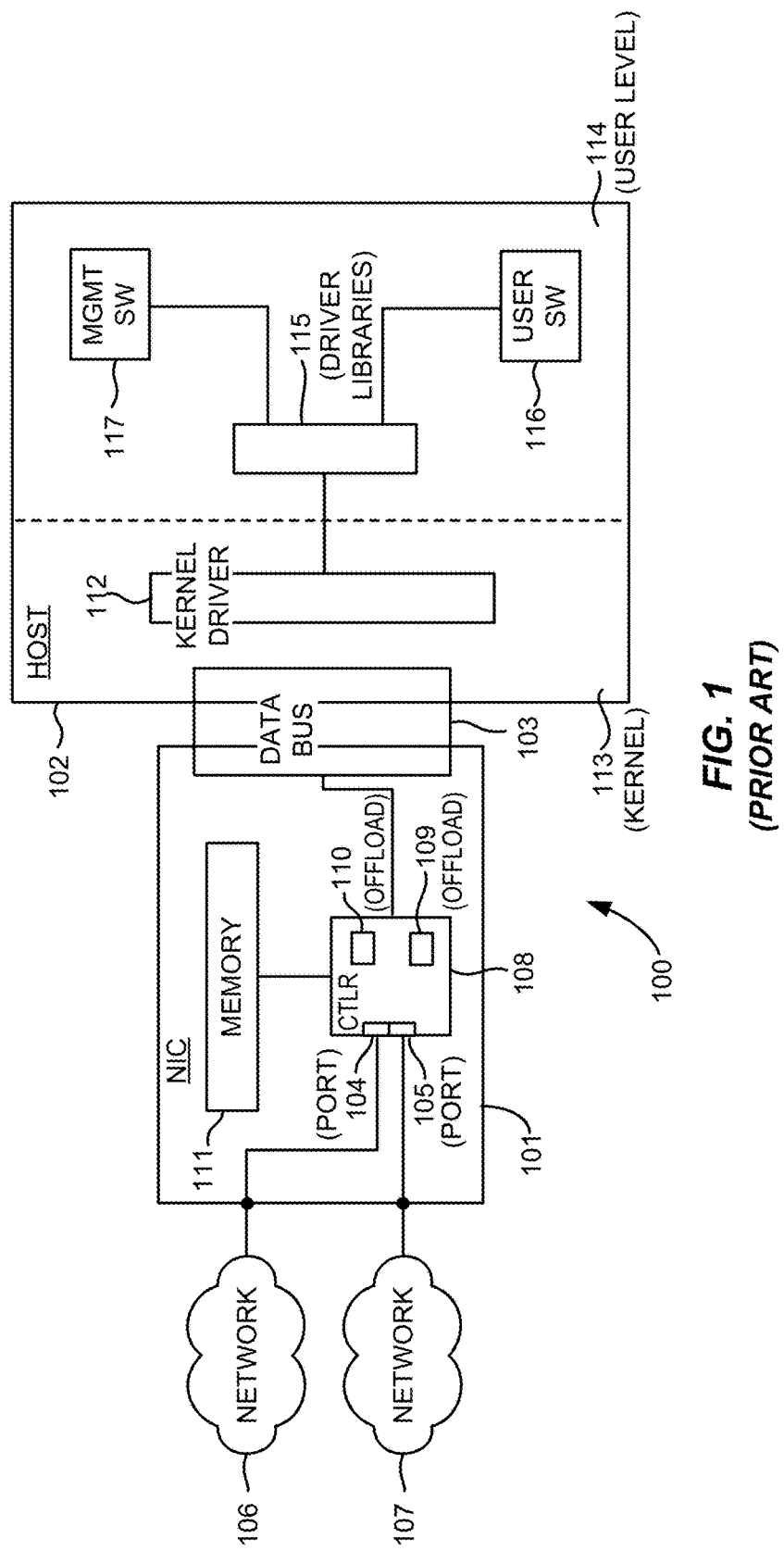
FIG. 1 is a schematic drawing of a data processing system of the prior art comprising a bespoke network interface device that provides one or more offloads defined in hardware.
Figure 2:
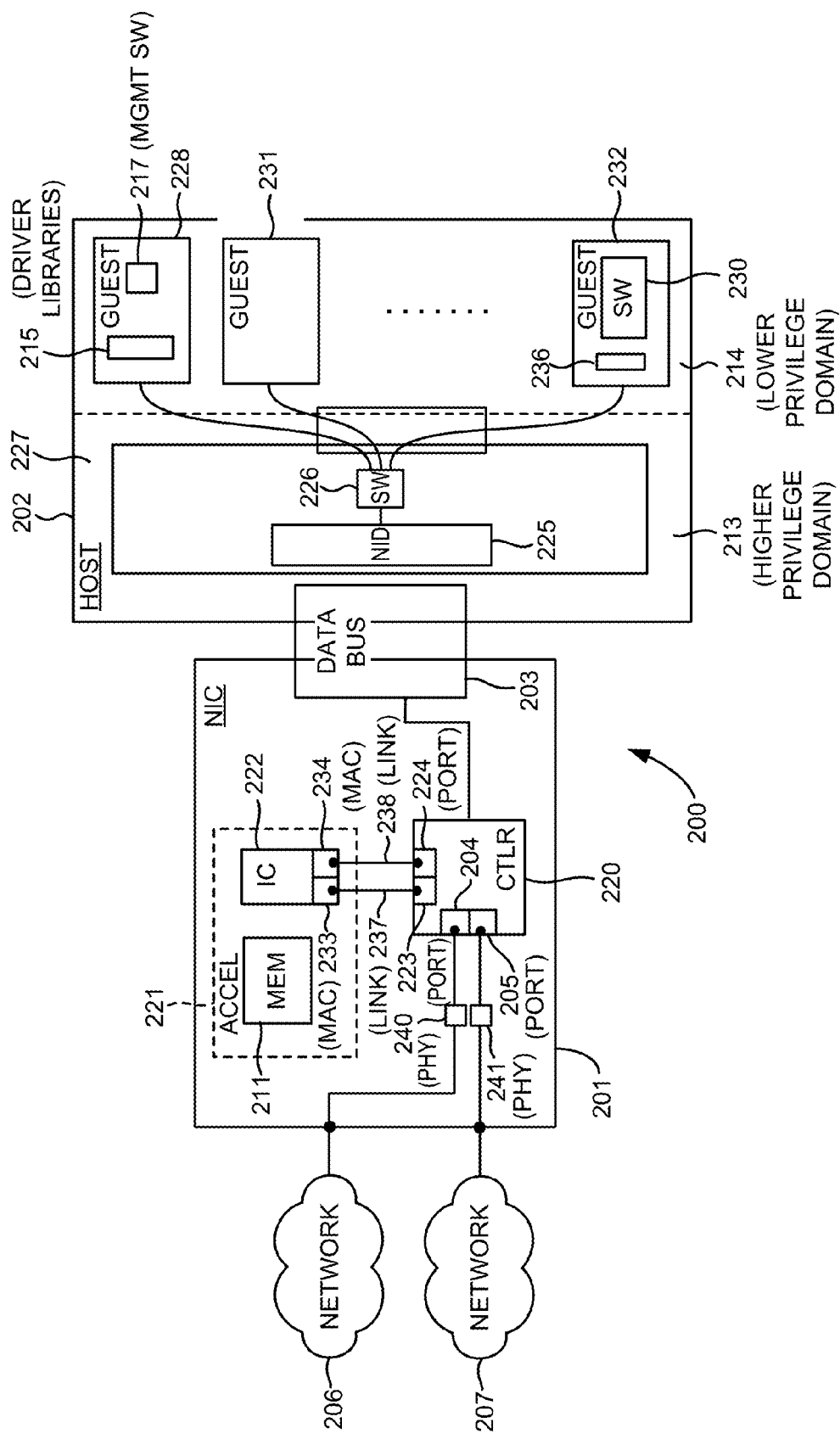
FIG. 2 is a schematic drawing of a data processing system configured in accordance with the present invention, the data processing system comprising a network interface device that provides one or more accelerator units.
Figure 3:
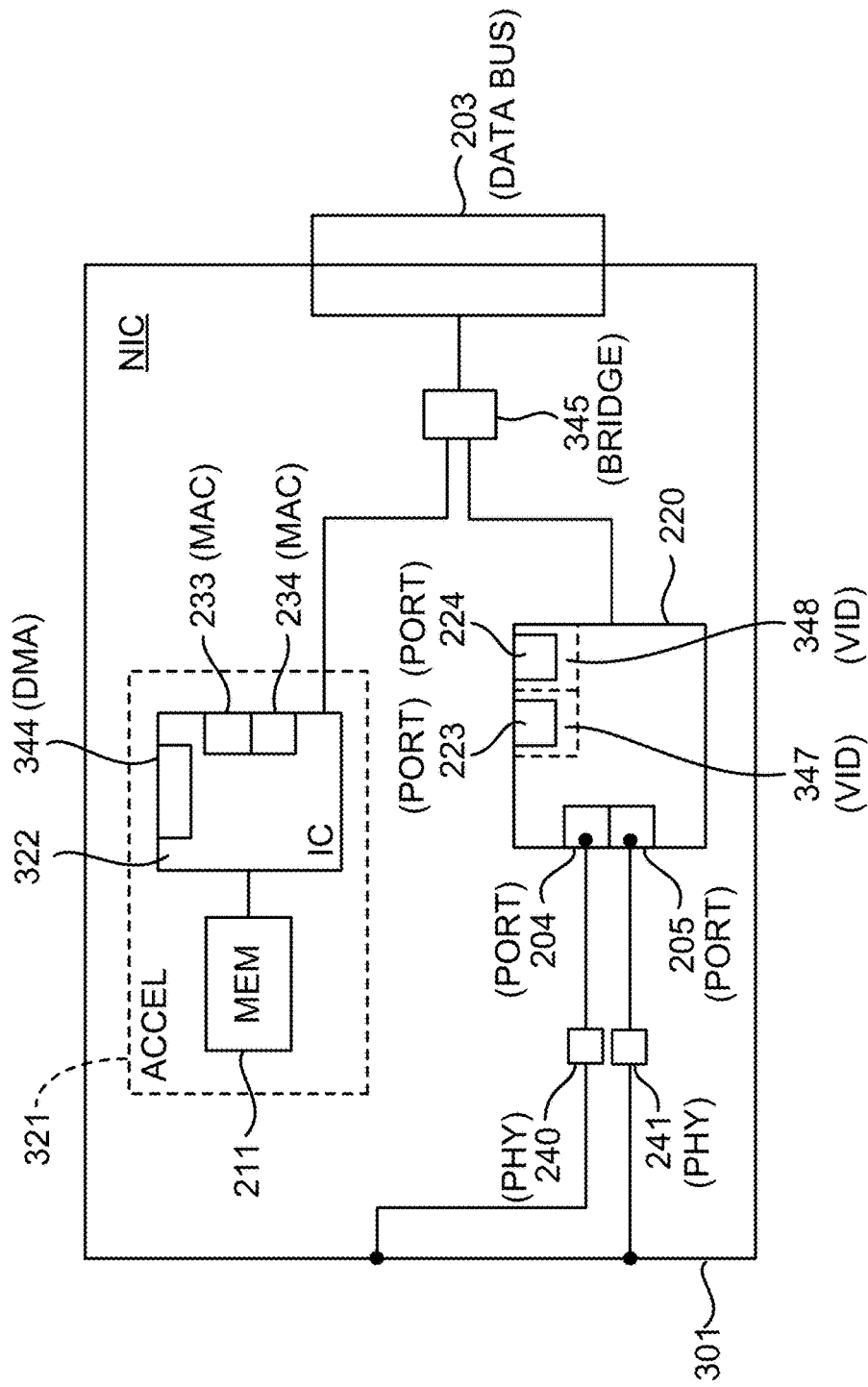
FIG. 3 is a schematic drawing of a network interface device configured in accordance with a second embodiment of the present invention for use in the data processing system of FIG. 2.

A network interface device and host system configured in accordance with the present invention is shown in FIGS. 2 and 3. The NIC 201/301 is a 4-port NIC comprising a controller 220 having four ports 204, 205, 223 and 224. Ports 204 and 205 provide access to physical networks 206 and 207, but ports 223 and 224 are not directed to external network fabrics and are instead directed to a hardware accelerator 221/321. Importantly, all the custom hardware offloads of the NIC are provided at the one or more accelerator integrated circuits 222/322 so as to allow controller integrated circuit 220 to remain uncustomised. The accelerator integrated circuits could be, for example, one or more FPGAs or other programmable integrated circuits. Optionally, hardware accelerator 221/321 includes a memory 211 for the storage of data relating to the offloads performed at accelerator IC 222/322.

A standard commodity network interface controller can be used as controller 220, which brings with it all the performance advantages of using commodity silicon. For example, in the case of an Ethernet NIC, controller 220 could be a 40 Gb/s part configured to support four ports at 10 Gb/s. At the present time it is not possible to support a throughput of 40 Gb/s at FPGAs or other programmable integrated circuits. Aside from the raw speed improvements gained by using a commodity ASIC controller, ASIC controllers and their software drivers are generally more highly optimised, and ASICs are cheaper, smaller and consume less power for a given performance level than FPGAs or other programmable ICs. Furthermore, the expensive custom parts 222/322 can also be smaller and more straightforward because the accelerator ICs do not need to provide the functions of a regular NIC controller (such as host interfaces, support for parts of a network stack etc.).

Each of the ports 204, 205, 223 and 224 includes a Medium Access Controller (MAC) (e.g. a data link layer device). MACs 204 and 205 of the NIC are provided with a PHY 240, 241 implementing the physical layer communication protocol in use over the NIC and coupling the MACs to the physical medium of networks 206 and 207. These NIC MACs could be implemented at controller 220, could be provided at a separate integrated circuit, or could be part of a multi-chip module (MCM) with the controller IC.

In the present invention the network interface device and hardware accelerator are configured such that the hardware accelerator can be addressed as a network endpoint. Hardware accelerator 221/321 is configured to present itself as one or more network endpoints to which data packets can be addressed by providing a MAC 233, 234 for each port of the hardware accelerator. The MACs of the hardware accelerator could be implemented at accelerator IC 222, could be provided at a separate integrated circuit of the accelerator, or could be part of a multi-chip module (MCM) with the accelerator IC 222. Hardware accelerator 221/331 therefore differs from other forms of custom accelerator (for example, a GPGPU) that terminate data flows and that require a NIC configured to support a proprietary interface to the accelerator and/or an interface that requires additional driver layers at the host computer system.

The hardware accelerator could be configured to process data packets arriving in data flows at its one or more endpoints and forward the processed data packets, or data generated in dependence on the received data packets, onto one or more receive queues at the host computer system. Thus, the hardware accelerator could process a stream of data packets arriving at one or more of its endpoints on-the-fly. The routing table of the NIC would be configured to appropriately switch data packets between the endpoint(s) of the accelerator, receive queues of the host computer system and the network endpoints of remote hosts accessible over the network. Alternatively or additionally, the hardware accelerator could process data packets arriving in data flows at its one or more endpoints and store the processed data in its memory 211, the accelerator being configured to allow appropriately formed data packets to query the data stored in the memory.

A data processing system and network interface device configured in accordance with the present invention is shown in FIG. 2. MACs 223 and 224 of the NIC that are directed to the hardware accelerator 221 are coupled to the MACs 233 and 234 of the accelerator by means of links 237, 238, which could comprise PHYs or serial interface devices, such as a KX4 serial device. The use of serial interface devices has the advantages that they are low power and can be implemented using standard SERDES libraries. Preferably the links 237, 238 each comprise a PHY or serial interface device located at the NIC and a corresponding PHY or serial interface device located at the hardware accelerator so as to provide the physical interface between the MAC of the NIC and the corresponding MAC of the hardware interface (e.g. between MACs 223 and 233.

The PHYs or serial interface devices of the NIC could be implemented at NIC controller 220, could be provided at a separate integrated circuit of the NIC, or could be part of a multi-chip module (MCM) with the controller IC 220. The PHYs or serial interface devices of the hardware accelerator could be implemented at accelerator IC 222, could be provided at a separate integrated circuit of the accelerator, or could be part of a multi-chip module (MCM) with the accelerator IC 222.

A network interface device configured in accordance with a second embodiment of the present invention is shown in FIG. 3, the network interface device being for use in the data processing system of FIG. 2. Hardware accelerator 321 includes a DMA interface 344 configured so as to allow one or more DMA channels to be established between the hardware accelerator and the NIC 301. NIC 301 includes a data bus interface bridge 345 so as to provide a connection between the hardware accelerator and the data bus 203, and the NIC controller and the data bus. In the example shown in FIG. 3, the data bus is a PCIe data bus and the bridge is a PCIe bridge. In this embodiment, each data port of the hardware accelerator is a dedicated DMA channel over which DMA data transfers can be performed between the hardware accelerator and NIC controller. The hardware accelerator is connected to the PCIe bridge by means of an interface appropriate to the bridge circuitry being used. Suitable interfaces might be one of a simple UART, a SERDES device (such as a KX4 serial interface device), and a local bus interface.

The hardware accelerator and NIC are configured so as to establish a dedicated DMA channel between themselves and allow the low latency exchange of data between the hardware accelerator and NIC. The hardware accelerator therefore includes DMA interface 344, which is preferably part of accelerator IC 322. The DMA interface implements the memory model so that the NIC controller can act as a bus master DMA device to memory locations supported at the hardware accelerator. Such memory locations could be virtual memory locations.

The NIC includes a MAC 223, 224 for each port (or dedicated DMA channel) of the hardware accelerator (in FIG. 3, there are two ports), with each MAC representing a virtual interface device 347, 348 of the NIC. The NIC does not need to provide a PHY for MACs 223 and 224 and neither does the hardware accelerator for its MACs 233 and 234. By arranging for each dedicated DMA channel of the hardware accelerator to address a corresponding virtual interface of the NIC, the virtual interfaces of the NIC can represent the data ports (or DMA channels) of the hardware accelerator (and are virtual ports of the NIC).

In both embodiments, NIC controller 220 includes switch functionality so as to allow the switching of data packets between its data ports and data bus 203. The controller is therefore operable to send data packets to the hardware accelerator that are received at the NIC and identified as being directed to the hardware accelerator in the same way as it might direct data packets destined for a remote endpoint on network 206 to port 204. This can be achieved by programming the switch of controller 220 to route data packets to particular data ports in dependence on the network endpoint (i.e. network address) to which each data packet is directed. Preferably, the switch of controller 220 can also be programmed such the particular network endpoint at the host system to which a data packet is directed determines the DMA channel into which it is delivered.

More generally, a NIC configured in accordance with the present invention could have any number of ports, provided that it has at least one port directed to a network and at least one port directed to a hardware accelerator as described herein.

Note that the accelerator integrated circuits need not be programmable and could be bespoke ASICs. This is unusual because of the high cost of designing and manufacturing an ASIC. However, it will be apparent that many of the advantages of the present invention remain: a network interface controller ASIC 220 is generally more highly optimised than a bespoke controller ASIC that is designed to support one or more hardware offloads, and because many of the complex functions present in a network interface controller need not be designed and manufactured at great expense as part of the custom ASIC. Alternatively, the accelerator IC could be a microprocessor or a dedicated hardware unit (such as a time stamp, or cryptographic module).

It is advantageous if NIC 201/301 is provided in two parts: hardware accelerator 221/321 and a reference NIC that includes all the parts of the NIC shown in FIGS. 2 and 3 except for the hardware accelerator; or equally, an accelerator IC 222/322 and a reference NIC that includes all the parts of the NIC shown in FIGS. 2 and 3 except for the accelerator IC. By providing at the reference NIC an interface configured to receive a hardware accelerator or accelerator IC, a single reference NIC design can be used with a variety of different hardware accelerators. This allows the custom offloads provided at the NIC to be readily upgraded or modified by simply replacing the hardware accelerator or accelerator IC at the NIC and installing new versions of the driver libraries for the hardware accelerator/accelerator IC at the host system.

The controller 220 is configured to interface with host system 202 over data bus 203, which could be, for example, a PCIe data bus. The data bus 203 could alternatively be the backplane of a blade server and could itself operate in accordance with one or more network protocols—for example, the data bus could be a high speed Ethernet backplane.

In accordance with preferred embodiments of the present invention, host system 202 is a virtualised system comprising a privileged software entity 227 (such as a hypervisor or virtual machine monitor) that presents a virtual operating platform to a plurality of guest operating systems 228, 231 and 232. The privileged software entity 227 operates at a higher level of privilege 213 (e.g. kernel mode) than the guest operating systems, which operate at a lower level of privilege 214 (e.g. user level mode).

Privileged software entity 227 includes a network interface device driver 225 that is configured to provide a software interface to NIC controller 220. Importantly, because controller 220 is not customised, driver 225 can be a standard driver for the controller whose code has been certified by a trusted party, such as the vendor of the privileged software entity (e.g through the VMWare IOVP or Microsoft WHQL programs). The driver could also be digitally signed so as to authenticate the origin of the code. For example, if the NIC is an Ethernet NIC and the privileged software entity a Hyper-V Hypervisor of Microsoft Windows Server 2008, then driver 225 could be provided by the NIC vendor and certified by Microsoft for operation in the hypervisor. Since any software installed at the host system must necessarily trust the platform on which it was installed, software executing 230 at guest OS 232 can trust the driver over which it communicates. Furthermore, since driver 225 does not provide any custom functionality and need not be updated when any offload functions implemented at the NIC are modified, it would be possible for the operator of software 230 running at guest domain 232 to check the driver for any malicious or buggy code and trust that the driver is certified and remains unmodified throughout the production life of the machine.

Privileged software entity 227 also includes a soft switch configured to route data packets between the guest operating systems and the network endpoints served by the NIC (i.e. on networks 206 or 207, or at the hardware accelerator), and between network endpoints at the guest operating systems themselves. Network endpoints are, for example, Ethernet or internet protocol (IP) network addresses. Typically, the soft-switch operates only on the standard set of network protocols supported by driver 225.

One of the guest operating systems 228 is configured to include driver libraries 215 for the hardware accelerator. Importantly, driver libraries 215 are configured to communicate with the hardware accelerator by means of data (e.g. commands, responses, state information) encapsulated within network packets directed to an endpoint of the hardware accelerator. Such data packets are routed at soft switch 226 onto data bus 203 for the NIC, and at the switch functions of NIC controller 220 the data packets are routed onwards to port 223 or 224 and hence the hardware accelerator. Similarly, hardware accelerator 221/321 is configured to communicate with driver libraries 215 by means of data (e.g. commands, responses, state information) encapsulated within regular network packets directed to an endpoint of guest operating system 228 (e.g. a receive queue of the driver libraries 215). In this manner, communications between the driver libraries 215 of the hardware accelerator and the hardware accelerator itself can be achieved using regular network packets that can be handled as such at the switches of the system. The benefits of this are twofold: firstly, it allows the hardware accelerator to be implemented at a high speed port of a commodity NIC as though the hardware accelerator is a network entity addressable over a particular port; and secondly, it allows the driver libraries for the hardware accelerator to be located outside of the kernel at a guest operating system having a low privilege level.

The architecture of the host system is therefore arranged such that none of the code relating to the functions of the hardware accelerator is at a higher privilege level than any sensitive or secret software 230 executing in another guest operating system 232. Software 230 could be, for example, a bank's high frequency trading software comprising a set of highly valuable proprietary trading algorithms. By isolating driver libraries 215 from software 230 in this manner, the owners of software 230 can be confident that any malicious or buggy code provided by the vendor of the hardware accelerator 221/321 cannot cause the activities of software 230 to be revealed. Accelerator vendor domain 228 could also include any management software 217 for the hardware accelerator.

Accelerator vendor libraries 215 and accelerator management software 217 are arranged to configure the offload functions performed by the hardware accelerator. This can be by, for example, defining the normalisation parameters to be applied to each type of stock and managing the use of memory 211 by the offloads of the accelerator IC.

Software 230 is configured to communicate with accelerator driver libraries 215 by addressing the driver libraries as a network endpoint. In other words, software 230 transmits network data packets to a network endpoint represented by a receive queue of the driver libraries as though the driver libraries were a remote network entity. Similarly, driver libraries 215 are configured to communicate with software 230 by addressing the software as a network endpoint. The data packets sent between the software and driver libraries encapsulate commands, responses and other data in an analogous way to the system calls and responses exchanged between software and kernel drivers in conventional host systems.

Since all data to and from the hardware accelerator is encapsulated as network data packets, software 230 can communicate with vendor libraries 215 and hardware accelerator 221/321 by means of a generic application programming interface (API) 236 at the software domain 232. The API maps network send and receive requests by software 230 into the transmission and reception of network data packets. Preferably the protocol in use over connections between software 230 and the hardware accelerator or vendor libraries is a light, low latency protocol such as UDP (User Datagram Protocol). The API could be a POSIX API or other generic API suitable for use at domain 232. No proprietary accelerator vendor code is therefore required at domain 232.

As is well known in the art, some aspects of the formation of data packets in accordance with the network protocol could be performed at the NIC, such as checksum formation. However, it is preferable that connections between software 230 and hardware accelerator 221/321 or vendor libraries 215 are configured such that checksums are not required in data packets exchanged between those entities.

Using a standard network encapsulation and a commodity NIC controller for all messages exchanged with the hardware accelerator has a number of advantages:

1. Non-accelerated data flows that do not need or benefit from hardware acceleration can be delivered to the host system in a conventional manner without passing through the hardware accelerator. This allows such data flows to be delivered with the lowest possible latency, which, for example, is very important for high-frequency trading applications.

2. Data flows can be delivered using receive side scaling (RSS), interrupt moderation and other techniques that improve performance at a host system having a multi-core CPU architecture.

3. Data flows can be delivered using direct guest access to the guest domains of the virtualised host system, with the hardware virtual switch of controller 220 being configured to select the appropriate DMA delivery channel.

4. A PCIe controller 220 can be selected that implements the SR-IOV or MR-IOV virtualisation standards that allow multiple DMA channels to be mapped directly into virtual guest address spaces.

None of these advantages depends upon additional functionality being provided at the hardware accelerator. It can be particularly advantageous to use one or more of these three techniques together at a data processing system.

Note that the advantages described above of a NIC configured in accordance with the present invention do not rely on the NIC being supported at a host system having a virtualised architecture as shown in FIGS. 2 and 3: other host system architectures could be used with NIC 201/301 in which the offload functions of the hardware accelerator can be accessed as network endpoints. However, a data processing system comprising the combination of NIC 201/301 and host system 202 of FIGS. 2 and 3 is particularly advantageous since it provides all the performance, cost and flexibility benefits of a NIC as described herein with all the security and stability benefits of a host system having the architecture shown in the figure.

The data processing system and network interface card described herein benefits from the fact that all the 'kernel' mode components of the system can be provided by the commodity vendor and so can be more easily made robust over a large number of operating systems. For example, commodity NIC software is implemented in the mass-market and hence benefits from a commensurate level of engineering and investment. The use of such commodity code reduces the likelihood that the NIC driver would cause instabilities at the data processing system.

The operation of NIC 201/301 with host system 202 will now be described by way of example. Suppose the data processing system is a high frequency trading server owned by a bank and the accelerator IC of the hardware accelerator at the NIC provides a set of database normalisation offloads that can be performed on stock data received from an exchange accessible over network 206. Such offloads would be performed by the accelerator IC prior to storing the normalised data at a database in memory 211. By appropriately configuring the routing tables of the switch of NIC controller 220, stock data feeds arriving at port 204 of the NIC from the exchange would be directed to port 223 by the controller for normalisation by the appropriate hardware offloads defined at the accelerator IC. The routing tables of the switch of NIC controller 220 can be configured by means of driver 225 as is well known in the art—typically in response to a routing table update request from management software supported at the host system. Preferably the bank's trading software 230 would be configured to cause the routing table of the controller switch to be maintained such that stock feeds received from the remote exchange are directed to endpoints accessible over port 223. The hardware accelerator may represent a plurality of endpoints, with each endpoint relating to a different feed for example.

As stock feeds stream in over port 204 and are routed for normalisation at the accelerator IC, a normalised database of stock data is built up at memory 211. This is the data that is valuable to the bank's trading algorithms embodied in trading software 230 and that must be accessed in order to allow the software to make trading decisions. Access to the hardware accelerator is mediated by accelerator vendor libraries 215. Thus, if trading software requires access to the hardware accelerator, the vendor libraries 215 are configured to establish connection(s) between one or more endpoints of the hardware accelerator and one or more endpoints of the trading software.

Once a connection between the trading software and hardware accelerator has been established (e.g. a connection between an endpoint of the hardware and an endpoint at guest domain 232 has been set up), trading software 230 can read and write to hardware accelerator by means of generic API 236 and the protocol stack. In this example, data is exchanged between the trading software and hardware accelerator in accordance with the UDP protocol. Thus, in response to appropriate read requests from software 230, data from the stocks database at memory 211 is encapsulated at the hardware accelerator in data packets for transmission over the network to the receive queues of software 230 at guest domain 232. To ensure low latency delivery of data to the trading software, the NIC controller 220 is configured to deliver data packets directed to guest domain 232 over DMA channels established between the NIC and the receive queues of the guest domain. In this manner, the trading software can access the stocks database generated by the normalisation offloads of the accelerator IC in order to allow the proprietary trading algorithms embodied in the software to determine the optimum trading decisions.

Note that the term database is used to refer to an organised cache of data at memory 211 and does not imply any particular general purpose database architecture. Database queries sent by the trading software in network data packets are preferably formatted in accordance with an API defined by the vendor of the hardware accelerator.

As trading software determines the trades it wishes to make, it transmits its stock trade requests over network 207 to the appropriate exchange: in this example, port 204 of the NIC is dedicated to receiving stock feed data and port 205 of the NIC is dedicated to handling the trades performed by the software at one or more remote exchanges accessible over network 207. Thus the NIC handles both accelerated flows (to/from the hardware accelerator) and conventional non-accelerated flows. Typically, the financial exchange at which the trades are requested is the same exchange from which the data feeds are being received. Trade requests could alternatively be sent over a separate network interface device.

The hardware accelerator need not be located at network interface device 201 or 301, and could be provided at another unit of the data processing system and connected directly to the network interface device. For example, the hardware accelerator could be provided at a PCIe card connected to the NIC by a serial ribbon cable. If the NIC is configured in accordance with the second embodiment described above, ports 223 and 224 of the NIC could be provided with PHYs and the hardware accelerator could be connected to the NIC by a network link—for example, the hardware accelerator could be another peripheral card of the host system and a short loop-through network link could be provided between the accelerator and NIC. In fact, if the PCIe root complex of a PCIe card supporting the hardware accelerator were to support DMA data transfers then the hardware accelerator could be provided at a PCIe card and connected to a PCIe NIC by DMA channels established between the hardware accelerator and NIC over the PCIe bus, without any additional connection being provided between the two PCIe cards.

The network interface device itself need not be provided at a discrete peripheral card of the system and could be located at the mainboard of the system (i.e. as a LOM device).

The data packets exchanged between the receive queues of the host system and the network endpoints of the hardware accelerator could be, for example, UDP data packets directed to network endpoints identified by IP addresses.

A media access controller or MAC configured in accordance with the present invention could include multiple protocol layers and is not restricted to handling a MAC layer communications protocol. Which protocol layers are supported at a MAC depends on the particular network protocols in use over the data port for which the MAC is provided. For example, if the data port is a port of an Ethernet network interface device directed to a hardware accelerator, the MAC would preferably perform only the Ethernet MAC layer, but could also perform the Ethernet LLC layer. With such an arrangement, the network endpoint supported at the MAC of a hardware accelerator would be an Ethernet network address and data communicated with the hardware accelerator would be encapsulated in Ethernet frames at the NIC.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A network interface device comprising:
a controller unit having a first data port for connection to a network, a second data port, and a data bus interface for connection to a host computer system, the first data port having a first medium access controller and the second data port having a second medium access controller, the controller having a switch which, in dependence on the network endpoints to which data packets received at the network interface device are directed, switches of data packets between the first and second data ports and the data bus interface; and
an accelerator module having a third data port having a third medium access controller, said third data port being coupled to said second data port of the controller unit, said accelerator module comprising hardware which in use performs one or more functions in hardware on data packets received at the accelerator module;
wherein said third medium access controller in use supports one or more first network endpoints such that, in use, data packets identified by the controller unit as being directed to said one or more first network endpoints are sent over the second data port to the third port of the accelerator module.

2. The network interface device as claimed in claim 1, wherein the said one or more functions performed by the hardware are non-communications functions.

3. The network interface device as claimed in claim 2, wherein the said one or more functions performed by the hardware do not include functions relating to the performance of network communications protocols in use at the network interface device.

4. The network interface device as claimed in claim 1, wherein the said one or more functions performed by the hardware do not include functions relating to the performance of network communications protocols in use at the network interface device.

5. The network interface device as claimed in claim 1, wherein the one or more functions performed by the hardware include one or more of: normalisation of financial information prior to storage at a memory of the accelerator module or transmission to a host computer system accessible over the data bus interface; serialisation of trades directed to a financial exchange; analysis of scientific data; digital audio and/or video processing; and in-line cryptographic functions.

6. The network interface device as claimed in claim 1, wherein the first data port of the network interface device includes a medium access controller coupled to a physical layer transceiver.

7. The network interface device as claimed in claim 1, wherein the second medium access controller is coupled to a second serial interface device, and the first medium access controller of the accelerator module is coupled to the second data port by means of a first serial interface device, said first and second serial interface devices being connected so as to allow the communication of data between the second data port and the accelerator module.

8. The network interface device as claimed in claim 1, wherein the second medium access controller is coupled to a second physical layer transceiver, and the first medium access controller of the accelerator module is coupled to the second data port by means of a first physical layer transceiver, said first and second physical layer transceivers being connected so as to allow the communication of data between the second data port and the accelerator module.

9. The network interface device as claimed in claim 7, wherein the controller unit and the accelerator module are provided at separate peripheral devices and the controller unit is coupled to the accelerator module by a connection between the first serial interface device and the second serial interface device.

10. The network interface device as claimed in claim 9, wherein the separate peripheral devices are located on separate integrated circuit chips.

11. The network interface device as claimed in claim 1, further comprising:
at the accelerator module, a DMA controller and a data bus interface;
wherein the controller unit is configured to provide a virtual interface of the network interface device that includes said second media access controller but not a physical layer transceiver, and the DMA interface is configurable so as to allow the accelerator module to exchange data with said virtual interface of the network interface device over a DMA channel.

12. The network interface device as claimed in claim 11, further comprising a data bus bridge arranged for connecting the data bus interface of the hardware accelerator and the data bus interface of the controller unit to a data bus.

13. The network interface device as claimed in claim 11, wherein the controller unit and the accelerator module are provided at separate peripheral devices and their respective data bus interfaces are configured for connection to a data bus.

14. The network interface device as claimed in claim 13, wherein the separate peripheral devices are located on separate integrated circuit chips.

15. The network interface device as claimed in claim 12, wherein the data bus is a PCIe data bus and the virtual interface supports one or more SR-IOV or MR-IOV virtual configurations.

16. The network interface device as claimed in claim 1, wherein the accelerator module further comprises a memory configured for storing data generated by the said one or more functions performed by the hardware.

17. The network interface device as claimed in claim 16, wherein the accelerator module is operable to receive data packets from a host computer system accessible over the data bus interface and the accelerator module is configured to, in response to receiving a data packet including a read request directed to the memory, respond to the read request by encapsulating the requested data in one or more data packets for transmission to a network endpoint identified in the read request.

18. The network interface device as claimed in claim 17, wherein the accelerator module is configured to respond only to read requests received from a predetermined set of one or more network endpoints or over a predetermined set of one or more DMA channels.

19. The network interface device as claimed in claim 1, wherein the first medium access controller is an Ethernet MAC and the one or more first network endpoint are identified by an Ethernet address.

20. The network interface device as claimed in claim 1, wherein the hardware is an FPGA integrated circuit.

* * * * *